US008176210B2

(12) United States Patent  
Tang et al.

(10) Patent No.: US 8,176,210 B2
(45) Date of Patent: May 8, 2012

(54) UNIFIED HOST APPLICATION AND ASSOCIATED METHODOLOGY OF INTEGRATING LOCAL SERVICE OF A MULTI-FUNCTION PRINTER

(75) Inventors: Weiyun Tang, Livingston, NJ (US); Hiroshi Kitada, Tuckahoe, NY (US); Li Li, Monroe Township, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 1171 days.

(21) Appl. No.: 11/562,668

(22) Filed: Nov. 22, 2006

(65) Prior Publication Data

US 2008/0120563 A1  May 22, 2008

(51) Int. Cl.
*G06F 3/00* (2006.01)
(52) U.S. Cl. .............................................. 710/8; 710/16
(58) Field of Classification Search .................. 710/8
See application file for complete search history.

(56) References Cited

U.S. PATENT DOCUMENTS

| 2003/0030664 | A1* | 2/2003 | Parry ............................ 345/744 |
| 2004/0223182 | A1* | 11/2004 | Minagawa .................... 358/1.15 |
| 2004/0263900 | A1* | 12/2004 | Nguyen et al. ............... 358/1.15 |
| 2005/0149712 | A1* | 7/2005 | Martinez et al. .................. 713/1 |
| 2005/0162678 | A1* | 7/2005 | Nakata .......................... 358/1.13 |
| 2006/0026591 | A1* | 2/2006 | Backhouse et al. ........... 717/177 |
| 2006/0103869 | A1* | 5/2006 | Kato ............................. 358/1.13 |
| 2006/0212629 | A1* | 9/2006 | Suzuki et al. ................. 710/104 |
| 2008/0037049 | A1* | 2/2008 | Bahl et al. ..................... 358/1.13 |

FOREIGN PATENT DOCUMENTS

| JP | 2004-145604 | 5/2004 |
| JP | 2005-196414 | 7/2005 |
| JP | 2006-85291 | 3/2006 |

OTHER PUBLICATIONS

U.S. Appl. No. 11/669,746, filed Jan. 31, 2007, Kitada.
Office Action issued Jan. 17, 2012, in Japanese Patent Application No. 2007-288863.

* cited by examiner

*Primary Examiner* — Henry Tsai
*Assistant Examiner* — Kris Rhu
(74) *Attorney, Agent, or Firm* — Oblon, Spivak, McClelland, Maier & Neustadt, L.L.P.

(57) ABSTRACT

A method of invoking a set of services corresponding to a plug-in application installed on an image handling device. The method including launching a host application of the image handling device, accessing a configuration file of the image handling device, the configuration file including an identification of at least one plug-in and a corresponding set of services, launching the identified at least one plug-in, the plug-in providing the corresponding set of service in an integral fashion to the host application and presenting a unified graphical interface including host application services and the corresponding set of service of the plug-in.

10 Claims, 23 Drawing Sheets

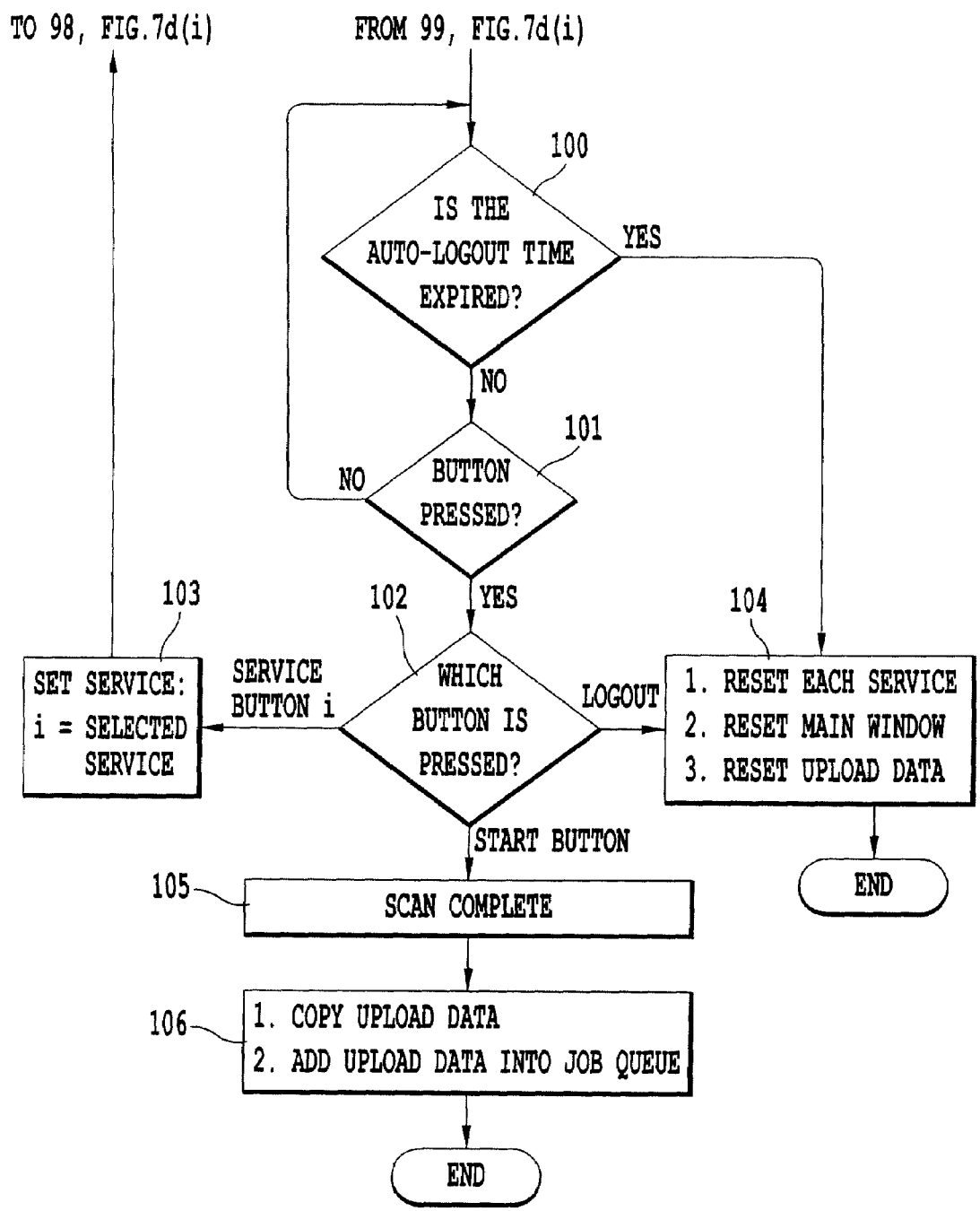
Fig. 7d(ii)

```
1   <root>
2        <JarFileList>
3             <Jar>eCabinet.jar</Jar>
4             <Jar>DocumentMall.jar</jar>
5        </JarFileList>
6        <Project>
7             <ProjectName>eCabinet</ProjectName>
8
9   <DefaultScanSetting></DefaultScanSetting>
10
11  <DefaultResolution>200</DefaultResolution>
12
13  <DefaultDoubleSidedScan>false</DefaultDoubleSidedSc
14  an>
15            <HasLogin>false</HasLogin>
16            <LoginClass></LoginClass>
17            <Service>
18
19  <ServiceName>eCabinet</ServiceName>
20           <DisplayName>eCabinet Owner</DisplayName>
21
22  <ServiceWindowClass>com.ricoh.UnifiedClient.eCabine
23  t.ECabinetWindow.class</ServiceWindowClass>
24
25  <DataHandlerClass>com.ricoh.UnifiedClient.eCabinet.
26  ECabinetServiceDataHandler.class</DataHandlerClass>
27                 <ConfigurationData>
28
29  <eCabinetServer>11.11.11.111</eCabinetServer>
30
31  <eCabinetServerPort>81</eCabinetServerPort>
32                  </ConfigurationData>
33                  <DataHandlerConfigurationData>
34
35  <eCabinetServer>11.11.11.111</eCabinetServer>
36                       <ftpPort></ftpPort>
37                  </DataHandlerConfigurationData>
38            </Service>
```

*Fig. 11A*

```
1          <Service>
2          <ServiceName>eCabinetFolder</ServiceName>
3          <DisplayName>eCabinet Folder</DisplayName>
4
5   <ServiceWindowClass>com.ricoh.UnifiedClient.eCa
6   binet.ECabinetFolderWindow.class</ServiceWindow
7   Class>
8
9   <DataHandlerClass>com.ricoh.UnifiedClient.eCabi
10  net.ECabinetServiceDataHandler.class</DataHandl
11  erClass>
12                     <ConfigurationData>
13
14  <eCabinetServer>11.11.11.111</eCabinetServer>
15
16  <eCabinetServerPort>81</eCabinetServerPort>
17                    </ConfigurationData>
18
19  <DataHandlerConfigurationData>
20
21  <eCabinetServer>11.11.11.111</eCabinetServer>
22                            <ftpPort></ftpPort>
23  </DataHandlerConfigurationData>
24             </Service>
25         </Project>
26
27         <Project>
28
29  <ProjectName>DocumentMall</ProjectName>
30
31  <DefaultScanSetting></DefaultScanSetting>
32  <DefaultResolution>200</DefaultResolution>
33  <DefaultDoubleSidedScan>true</DefaultDoubleSide
34  dScan>
35                  <HasLogin>true</HasLogin>
36
37  <LoginClass>com.ricoh.UnifiedClient.DocumentMal
38  l.DMLoginWindow.class</LoginClass>
```

*Fig. 11B*

```
1      <Service>
2        <ServiceName>DMEmail</ServiceName>
3        <DisplayName>DM Email</DisplayName>
4
5  <ServiceWindowClass>com.ricoh.UnifiedClient.Doc
6  umentMall.DMEmailWindow.class</ServiceWindowCla
7  ss>
8  <DataHandlerClass>com.ricoh.UnifiedClient.Docum
9  entMall.DMServiceDataHandler.class</DataHandler
10 Class>
11             <ConfigurationData>
12 <DMServer>documentmall.com</eCabinetServer>
13             </ConfigurationData>
14
15 <DataHandlerConfigurationData>
16     <DMServer>documentmall.com</eCabinetServer>
17 </DataHandlerConfigurationData>
18          </Service>
19
20         <Service>
21       <ServiceName>DMFolder</ServiceName>
22       <DisplayName>DM Folder</DisplayName>
23
24 <ServiceWindowClass>com.ricoh.UnifiedClient.Doc
25 umentMall.DMFolderWindow.class</ServiceWindowCl
26 ass>
27 <DataHandlerClass>com.ricoh.UnifiedClient.Docum
28 entMall.DMServiceDataHandler.class</DataHandler
29 Class>
30             <ConfigurationData>
31 <DMServer>documentmall.com</eCabinetServer>
32             </ConfigurationData>
33          <DataHandlerConfigurationData>
34 <DMServer>documentmall.com</eCabinetServer>
35 </DataHandlerConfigurationData>
36          </Service>
37      </Project>
38    </root>
```

| LOGO | eCabinet Owner | eCabinet Folder | Scan Settings | Doc Name | End Session |
|---|---|---|---|---|---|
| ↓ | | | | Job Log | ↑ |

Please Select a Destination

161 — LOGO
164 — eCabinet Owner
165 — eCabinet Folder
166 — Scan Settings
162 — Doc Name
35
163 — End Session
264 — (arrow)
259 — Data/Time
260 — Document Name
261 — Pages
167 — Status
262

UNIFIED HOST APPLICATION AND ASSOCIATED METHODOLOGY OF INTEGRATING LOCAL SERVICE OF A MULTI-FUNCTION PRINTER

BACKGROUND OF THE INVENTIONS

The present invention relates to a unified host application & associated methodology of integrating local service of a multi-function printer.

It should also be noted that the "background" description provided herein is for the purpose of generally presenting the context of the invention. Work of the presently named inventors, to the extent it is described in this background section, as well as aspects of the description which may not otherwise qualify as prior art at the time of filing, are neither expressly or impliedly admitted as prior art against the present invention.

Conventionally, when a user wanted to install a new service on a multi-function printer ("MFP") such as a file storage application, a new application had to be installed to the MFP that made these services available, as shown in FIG. 1.

For example, Document Mall(™) is an application for creating a secure online document storage, enabling an online shared workspace. Document Mall(™) combines security with web-based document management and collaboration features delivered as an on-demand, document management and document imaging service.

Likewise, eCabinet(™) is a network document repository that integrates with multi-function printers. eCabinet(™) provides users with the ability to capture documents and automatically index them, providing archive security coupled with fast retrieval.

In order to leverage these applications in an MFP context, the applications are installed by a service person that would travel to the physical site of the multi-function printer and install the applications manually.

For typical MFPs, various limitations only allow a limited number of applications to be installed. Thus, as shown in FIG. 22, a typical MFP 400 only has three applications 401a . . . c installed at an application layer 402. These applications found on the application layer 402 access the hardware 404 of the MFP through an Operation System 403.

One problem the present inventors recognized is that each application had to be rewritten for the specific hardware of the MFP on which the applications were to be installed. For example, different models of MFPs required different programming code in order to implement the Document Mall (™) application due to differences in the MFP model's hardware.

SUMMARY OF THE INVENTIONS

The present inventions provide, inter alia, a method of invoking a set of services corresponding to a plug-in application installed on an image handling device. The method includes launching a host application of the image handling device and accessing a configuration file of the image handling device. The configuration file includes an identification of at least one plug-in and a corresponding set of services. The method further includes launching the identified at least one plug-in. The plug-in provides the corresponding set of services in an integral fashion to the host application. The method also includes presenting a unified graphical interface including host application services and the corresponding set of service of the plug-in.

A method of implementing a unified client application on an image handling device, the image handling device including an application layer, hardware and an operating system. The method includes launching a host application, reading a configuration file. The configuration file includes configuration information to be utilized by the host application. The method also includes identifying a project array based on the number of installed plug-ins designated by the configuration file and identifying a service array for each project, based on the number of services included in the corresponding plug-in. The method further includes displaying a project array window. The project array window graphically displaying each project included in the project array. The method further includes displaying a main window and a default service window when a project is selected in the project array window. The main window includes graphical indicia of a plurality of project services. In addition the method includes displaying options in the corresponding service window for entry and selection when one of the graphical indicia to the plurality of project services is selected, adding upload data produced by the hardware of the image handling device and options entered and selected in the service window to a job queue and processing upload data in the job queue using a service data handle. The service data handler is a service for sending the upload data from the image handling device to a destination included in a configuration file.

A host application configured to provide the core service of the image handling device including a plug-in application configure to be programmatically invoked by the host application, and a configuration file stored in a memory which includes configuration information to be utilized by the host application. The host application is configured to programmatically invoke the plug-in in accordance with information of the configuration file.

It is to be understood that both the foregoing general description of the invention and the following detailed description are exemplary, but are not restrictive, of the invention.

BRIEF DESCRIPTION OF SEVERAL VIEWS OF THE DRAWINGS

Other objects, features and advantages of the present invention will become more apparent from the following detailed description when read in conjunction with the accompanying drawings, in which:

FIGS. 11a-11c show an example of a config.xml file;

FIG. 16 is an exemplary user interface of an eCabinet(™) plug-in in which the eCabinet(™) project main window and the job log service window are displayed;

DETAILED DESCRIPTION OF THE INVENTIONS

The present advancements relate, in part, to a method of invoking a set of services corresponding to a plug-in application installed on an image handling device. The image handling device is a MFP. The MFP is any printer or copier which includes multiple functions such as scanning, printing and/or faxing. Additionally, the MFP described above may include a copier that scans and prints a document in a single step as scanning and printing are distinct functions.

The method further includes launching a host application of the image handling device and accessing a configuration file of the image handling device. The host application may be executable code that interfaces with the operating system of the MFP and accesses the hardware of the MFP through the operating system.

The configuration file includes an identification of at least one plug-in and a corresponding set of services. The configuration file may be any type of configuration file including an extensible markup language such as XML, Standard Generalized Markup Language (SGML), GML, RDF/XML, RSS, Atom, MathML, XHTML, SVG, DSDL, XUL, MXML, EAD or Klip.

It should also be noted that the configuration file is able to be used in a mixed brand environment. Even if, for example, several different brands of copiers are used in an environment such as an office or a building, each unique brand will be able utilize the configuration file. In addition each different MFP may be able to load the unified client architecture and the plug-ins. Thus, each copier or multi-function device will be able to have the same basic interface and commands limited only be the functionality of the specific copier or multi-function printer in question.

Each plug-in includes a number of services that increase the functionality of the MFP. The method further includes launching the identified at least one plug-in. The plug-in provides the corresponding set of services in an integral fashion to the host application, where integral is defined as an organized array of individual elements and parts forming and working as a unit.

The method also includes presenting a unified graphical interface including host application services and the corresponding set of service of the plug-in. Examples of the unified graphical interface is discussed with reference to FIGS. 12-19 below.

Figure 1:
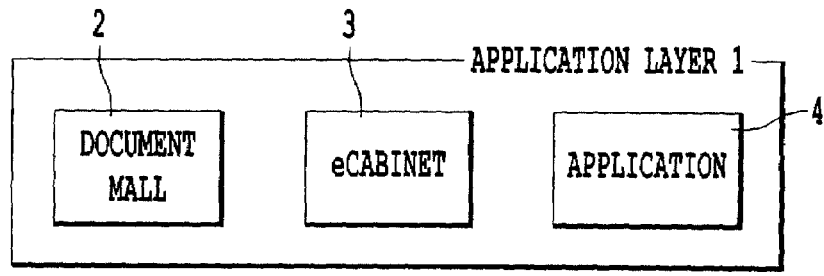
FIG. 1 is a block diagram showing a typical application layer included on a conventional MFP.
Figure 2:
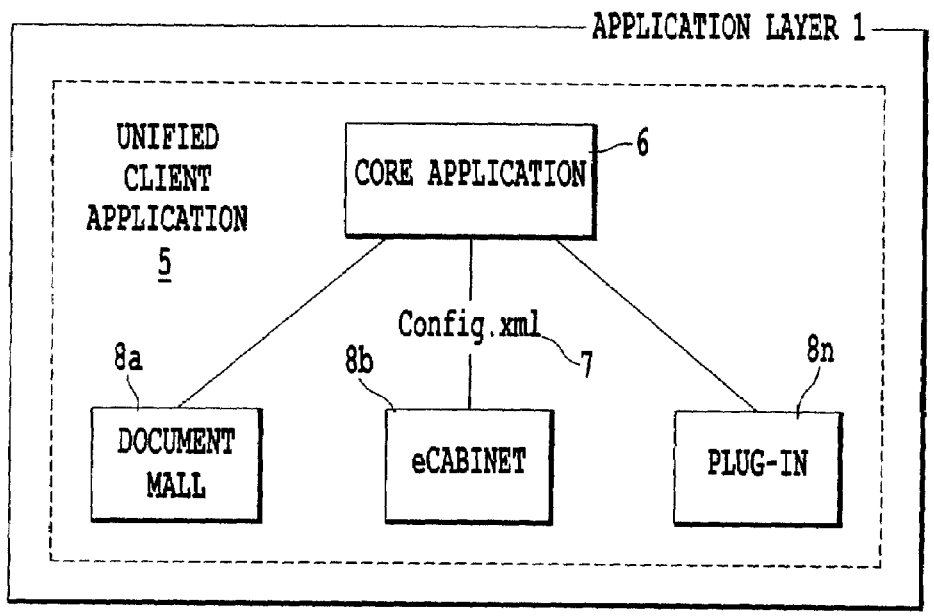
FIG. 2 is a block diagram of an application layer of an MFP according to an exemplary embodiment of the present invention.

Referring now to the drawings wherein like reference numbers designate identical or corresponding parts throughout the several views and more particularly to FIG. 2 thereof, there is illustrated an application layer 1 including a unified client application 5. The unified client application 5 installed on a MFP includes a core application 6, the core application being an application that includes primary routines that serve the application. These primary routines typically carry out basic functions of the MFP including scanning, printing, copying, faxing, and communicating, for example.

In FIG. 2, the unified client application 5 further includes a config.xml file 7 which includes settings regarding unified client application 5. Additionally, plug-ins 8a . . . n are controlled by the core application 6.

Different types of plug-ins can be installed in the unified client application 6. For example, in the present example depicted in FIG. 2, a Document Mall(™) plug-in 8a, han eCabinet(™) plug-in 8b and a generic plug-in 8n are installed.

A plug-in generally includes programs or code for operating the hardware of the multi-function printer via the core application 6. An alternate illustration of the Unified Client application 5 shown in FIG. 2 is set forth in FIG. 3 which includes the core application 6, the config.xml file 7 and the plug-ins 8.

Figure 4:
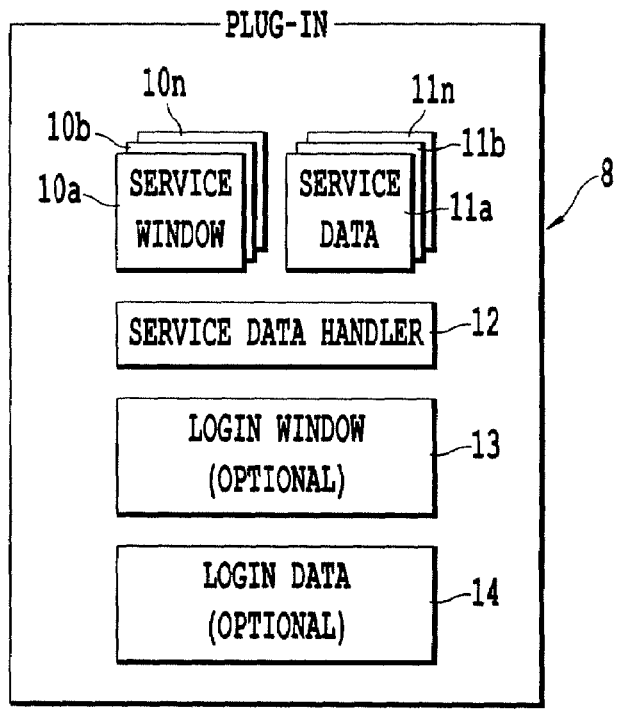
FIG. 4 is a block diagram showing a plug-in according to an exemplary embodiment of the present invention.

FIG. 4 shows an example of an internal structure of a plug-in 8. For example, the plug-in 8 may include a single service window 10a or may also include a number of service windows such as 10a . . . 10n. The service window 10a . . . n is a user interface that enables the user to interface with the service that corresponds to the service window 10a . . . n. Further explanation of the service window 10a . . . n will be discussed below with respect to FIGS. 12-16. The plug-in 8 may also include a single service data 11a or a number of service data elements 11a . . . 11n. Each service window 10a . . . n has corresponding service data 11a . . . n. The service data 11a . . . n generally includes service name, service id, configuration data corresponding to the service window 10a . . . n, default service window data and run time data entered by users through service window 10a . . . n.

The plug-in 8 also includes a service data handler 12 and optionally may include a login window 13 and login data 14, in other words, an authentication user interface. The service data handler 12 is the portion of the unified client application that uploads data from the MFP to a receiving device. In each plug-in 8, there may be multiple service windows 10a . . . n and service data elements 11a . . . n. However, according to one preferred embodiment, there is only one service data handler 12. Other embodiments may have more than one service data handler 12.

Figure 5:
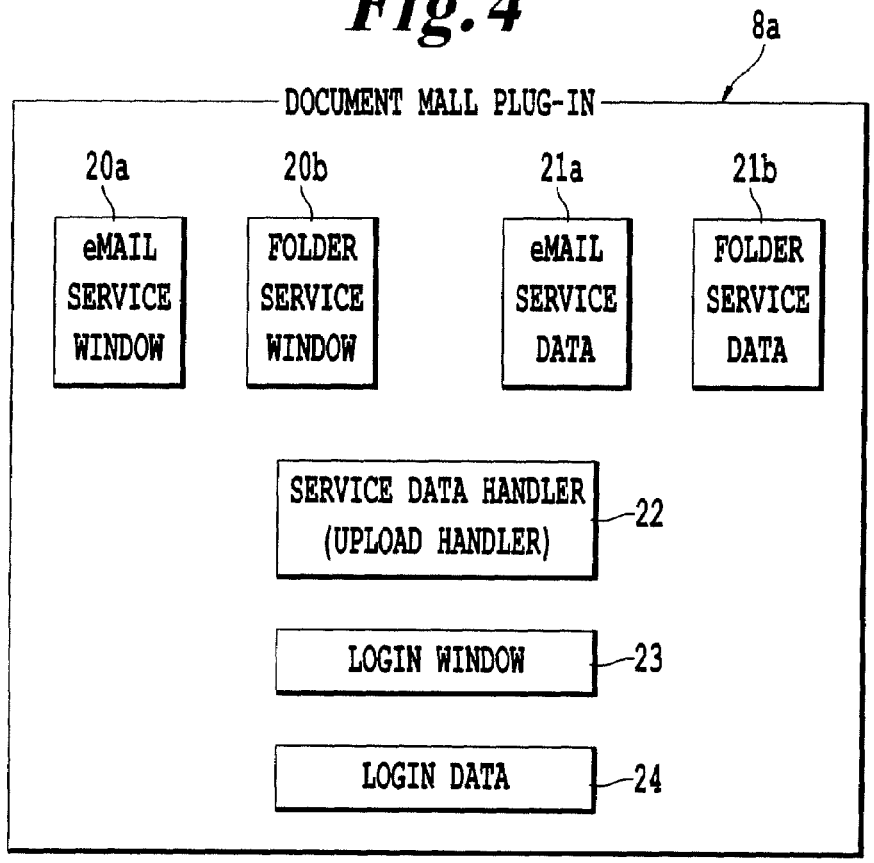
FIG. 5 is a block diagram showing an example of a plug-in for a Document Mall(™) application.

FIG. 5 depicts an example of the Document Mall(™) plug-in 8a. The Document Mall(™) service can be installed on the core application 6 as a plug-in 8. When the Document Mall (™) plug-in 8a is installed in the unified client application 5, the services provided by Document Mall(™) are extended to the MFP in which the unified client application 5 is installed. The Document Mall(™) plug-in 8a preferably includes the optional login window 23 and login data 24. These options allow user names, passwords and accounts to be input and utilized by the plug-in 8a, allowing the plug-in 8a to restrict unauthorized users from use of the plug-in 8a.

The Document Mall(™) plug-in 8a further includes several different service windows and service data. For example, in the Document Mall(™) plug-in 8a, an e-mail service window 20a and a folder service window 20b are included. The email service window 20a is a user interface enabling a user to enter a Document Mall(™) stored email address as a scan destination, while the folder service window 20b is a user interface that enables a user to select a Document Mall(™) folder as the scan destination. Further, an e-mail service data 21a and folder service data 21b are also included. The e-mail service data 21a and the folder service data 21b correspond to the data generated by the e-mail service window 20a and the folder service window 20b, respectively. The Document Mall (™) plug-in 8b also includes a service data handler 22. In the example of the Document Mall(™) plug-in 8a the service data handler 22 is used as an upload handler that merges both the e-mail service data 21a and the folder service data 21b into one upload.xml file, and sends the upload file to a Document Mall(™) server through an https post command, for example. Other uses for the service data handler 22 not mentioned in this example are also possible.

Figure 3:
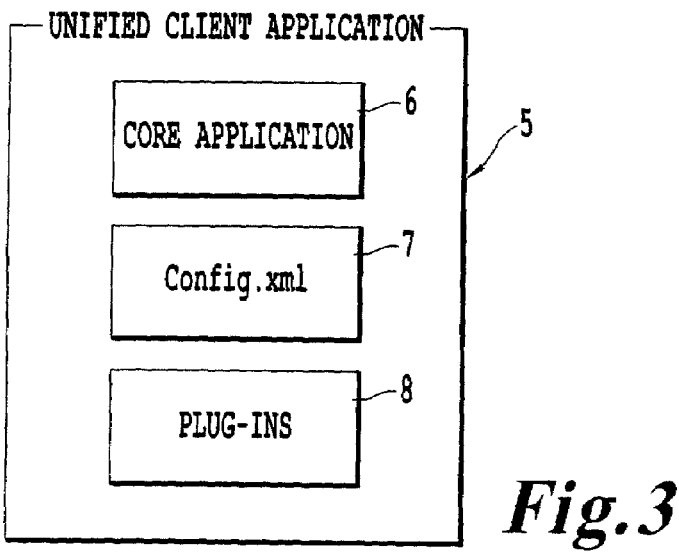
FIG. 3 is a block diagram showing a Unified Client Application according to an embodiment of the present invention.
Figure 6A:
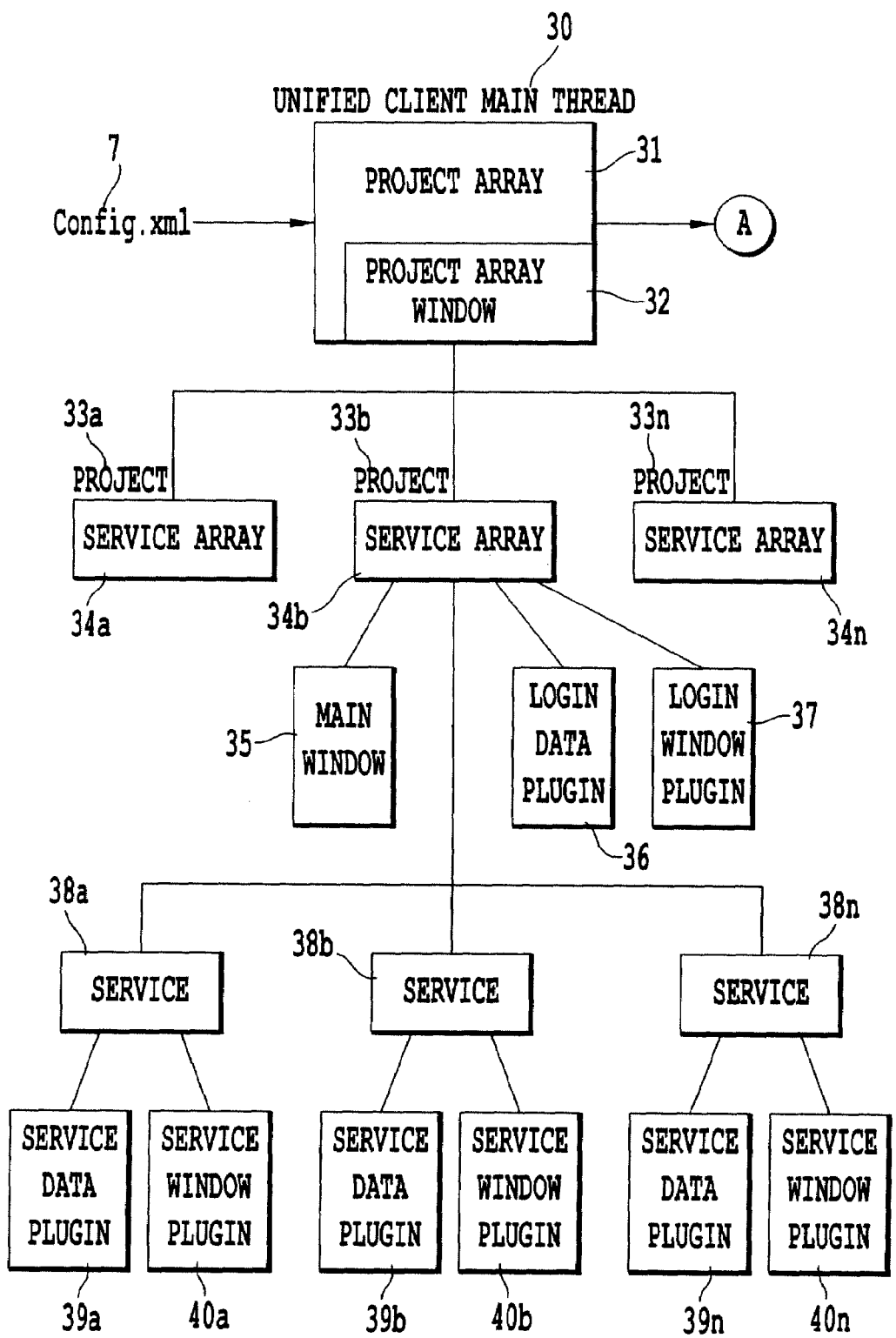
FIGS. 6a and 6b are process diagrams showing exemplary software architecture.

FIG. 6a shows the unified client software architecture structure. The unified client application 5, shown in FIGS. 2 and 3, is launched by a unified client main thread 30. In FIG. 6a, the unified client main thread 30 is shown as including a project array 31 and a project array window 32. The main thread 30 initializes the core application 6 and reads the config.xml file 7 to create the project array 31 which includes several projects 33a . . . n, each project 33a . . . n corresponding to at least one installed plug-in 8.

The project array 31 is a list of projects that are installed in the unified client application. The project array 31 is constructed reading <project> tags included in the config.xml file 7. Further, the main thread 30 creates service arrays 34a . . . n for each project 33a . . . n by reading <service> tags included in the config.xml file 7. The service array is a list of the services installed under a respective project. The main thread 30 also displays the project array window 32. The project array window 32 is the first screen displayed when using or executing the unified client application 6. However, according to one embodiment of the invention, if only one project 33b is configured on the system, the project array window 32 will be bypassed. The project array window 32 displays project buttons for the user to select. When a project button is selected, the corresponding project 33a . . . n is invoked. The project array window 32 will be discussed in further detail below with respect to FIG. 9.

Several projects 33a . . . n are shown in FIG. 6a connected to the project array 31. Each project 33a . . . n can manage a login/logout process of the project 33a . . . n through a corresponding login data plug-in 36 and login window plug-in 37. For example, if authentication is needed in the project 33a . . . n, a login window plug-in 37 can be used to display a login window which will be displayed before the user can begin accessing the project 33a . . . n. Once the login/logout button is pressed, a corresponding login and logout handler used by login data plug-in 36 will be called.

Further, the project 33a . . . n can control the post login process. For example, each service 38a . . . n can define its own post login process for its service window displayed by the service window plug-in 40a . . . n. When the authentication succeeds, the post login process of each service 38a . . . n will be called sequentially.

The login window displayed by the login window plug-in 37 described above, is an example of an authentication user interface ("UI") display. The login window, displayed by the login window plug-in 37, interfaces with the login data which is included in the login data plug-in 36 and includes an authentication process definition. Additionally, the login window used by the login window plug-in 37 can be implemented to request additional authentication information. As one example, for the Document Mall(™) plug-in 8a, the Document Mall(™) login window 23 may be implemented to include a place for users to enter account information. Other information may be utilized by the login window plug-in 37. Additionally, the service data handler 12. Further, each project 33a . . . n includes a main window 35 and a service array 34a . . . n.

In FIG. 6a, a main window 35 is associated with the project 33b. Although the main window 35 is only illustrated under project 33b, each project 33a . . . n may be implemented to include a main window. The main window 35 is used for service management for each service 38a . . . n which corresponds to a button, the button being a user selectable link to a service window, included in the main window 35. For example, in the Document Mall(™) plug-in 8a example, the main window 35 includes buttons for scanned setting handling, document name input and login button handling. Another example of the main window 35 is discussed below with respect to FIG. 10.

Included in each project 33a . . . n is a service array 34a . . . n. Each service array 34a . . . n includes a list of the included services 38a . . . n. A service 38a . . . n is a function relating to an installed plug-in. Each service 38a . . . n includes a service window plug-in 40a . . . n and a service data plug-in 39a . . . n. A service window included in the service window plug-in 40a . . . n displays a service window user interface. Further, the service window plug-in 40a . . . n performs the post-login process or gets and sets default values in the service data plug-in 39a . . . n. For example, in the post-login process of the Document Mall(™) plug-in 8a example, a Document Mall(™) folder service downloads the user's folder list and sets the user's folder as the default folder destination. The service window plug-in 40a . . . n also performs interactive operations with the user to interact and update the service data in the service data plug-in 39a . . . n. The service window plug-in 40a . . . n is an abstract class and, as such, certain behaviors of the service window plug-in 40a . . . n are predefined in the code. However, a developer is able add features to, or extend the service window plug-in depending on the needs of the developer. For example, in the Document Mall(™) plug-in 8a example, a Document Mall (™) e-mail service window supports both e-mail address search using the Document Mall(™) service, and manual e-mail address entry.

The service data included in the service data plug-in 39a. . . n is updated by the service window plug-in 40a . . . n based on user operations. Further, the service data included in the service data plug-in 39a . . . n is accessed by the service data handler 12 when upload operations are performed. For example, sending e-mails or uploading to network folders is performed by the service data handler 12 in the Document Mall(™) plug-in example 8a. As with the service window plug-in 40a . . . n, the service data plug-in 39a . . . n is an abstract class which can be updated or extended by plug-in developers to create further service related data. For example, in the Document Mall(™) plug-in 8a example, the Document Mall(™) e-mail service sends an e-mail based on the e-mail destination address that is saved in the service data included in the service data plug-in 39a . . . n.

Thus, the unified client main thread 30 includes a project array 31 which lists several projects 33a . . . n, each project including the service array 34a . . . n which lists several services 38a . . . n. The projects 33a . . . n are displayed on a project array window 32 and each project includes a main window 35, and optionally a login window which is displayed before the main window 35, the login window could alternatively be displayed simultaneously with the main window 35. Further, each service 38a . . . n includes a service window included in the service window plug-in 40a . . . n.

It should also be noted that multiple plug-ins 8 can be associated with a single project 33a . . . n. For example, if the Document Mall(™) plug-in 8a and eCabinet(™) plug-in 8b are included in a single project 33a . . . n, users will see both Document Mall(™) and eCabinet(™) service windows 40a . . . n in main window 35. If a user enters all necessary information in corresponding service windows 40a . . . n, one scan job can be delivered to both the Document Mall(™) and eCabinet(™) servers.

Figure 6B:
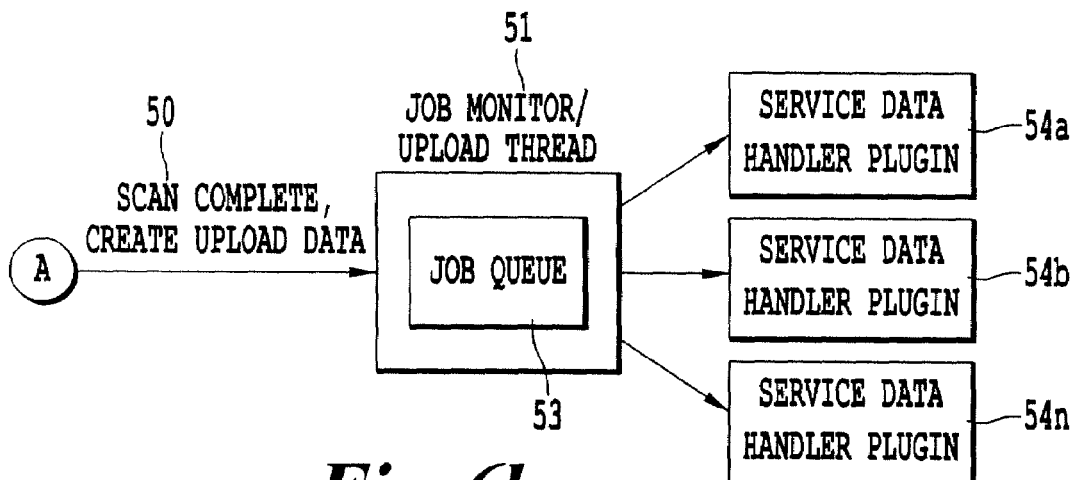

Turning now to FIG. 6b, this figure connects to FIG. 6a by symbol connector A. Once a scan by the MFP is completed, upload data 50 is created. The upload data 50 includes a document name, scan data, login data and service data, for example. The upload data 50 can also include any other information that can be uploaded by a service data handler 54a . . . n to a reception device. The service data handler 54a . . . n performs upload of data from the MFP and each service data handler is related to a project 33a . . . n. An upload thread/job monitor 51 includes a job queue 53. The upload thread/job monitor 51 is a background process that monitors the job queue 53 and processes the jobs when they become available. The upload thread/job monitor 51 is connected to the service data handler 54a . . . n. When a scan completes, the main thread 30 posts its final upload data 50 and adds it to the job queue 53.

For each job, the upload thread/job monitor 51 groups upload data 50 based on the corresponding service data handler 54a . . . n and invokes the corresponding service data handler plug-in 54a . . . n to process the upload data 50. For example, in the Document Mall(™) plug-in 8a example, the upload thread/job monitor 51 passes generic data such as scan or image file related information, login data e-mail service data and folder service data to the Document Mall(™) service data handler plug-in 54a . . . n to be processed. Once the upload thread/job monitor 51 has completed the above steps, the final steps are to get a job upload status and update a job log. The job upload status is the status of the upload by the service data handler 54a . . . n and the job log is the list of jobs processed by the upload thread/job monitor 51.

As described above, the service data handler 54a . . . n performs the upload of the upload data 50. For example, in the Document Mall(™) plug-in 8a example, the service data handler 54a . . . n receives generic data, login data e-mail service data such as e-mail destinations and folder service data such as folder destinations. Finally the service data handler 54a . . . n composes the received upload data 50 into an upload.xml file and uploads the xml file to a Document Mall (™) server designated in the config.xml file 7 via a http post process. Finally the service data handler 54a . . . n reports the upload status to the job monitor for job logging.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

FIGS. 7A-7D show a flowchart of the unified client main thread 30. After starting in FIG. 7A, the unified client application 5 is initialized in step 60. The unified client application 5 is initialized by first initializing the core application 6. The config.xml file 7 is then read in step 61, the config.xml file 7 including settings for the core application 6 and for the plug-ins 8 which are associated with the host or core application 6. A project array 31 is then constructed in step 62 based on the number of installed plug-ins 8. Next in step 63, the service array 32a . . . n is constructed for each project 33a . . . n. Further a main window 35 is constructed in step 64. As noted earlier, FIG. 10, discussed in more detail below, shows an example of the main window 35. Flow then proceeds to process B in FIG. 7B.

Figure 7A:
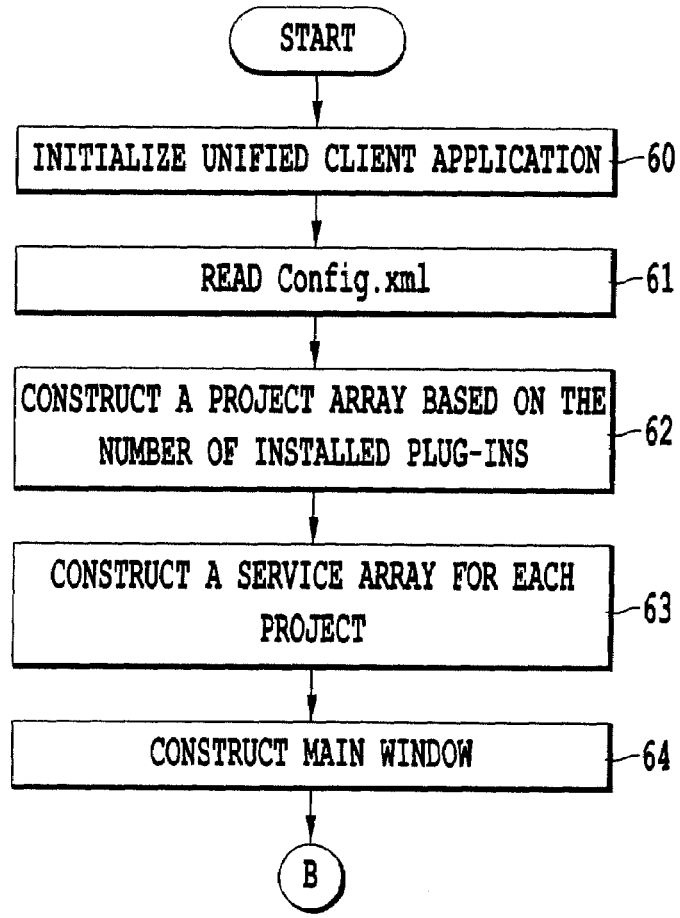
FIGS. 7a, 7b, 7c and 7d are flowcharts showing a procedure of the process of the Unified Client Main thread.
Figure 7B:
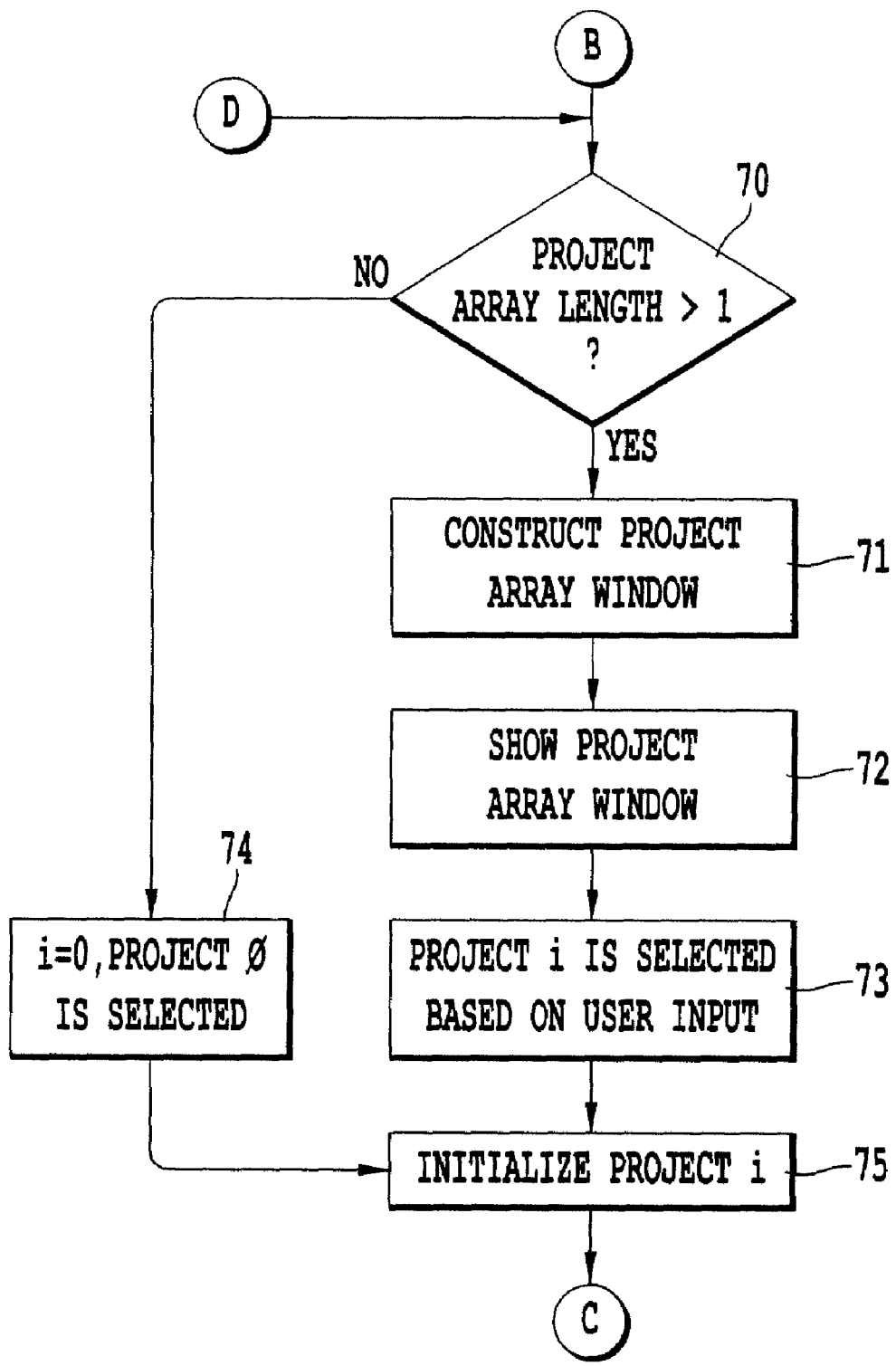

In FIG. 7B, the project array 31 length is checked in step 70. The project array 31 includes a list of the projects 33a . . . n which are configured in the unified client. If the project array 31 length is greater than 1, the flow proceeds to step 71. However, if the project array 31 length is not greater than 1, flow proceeds to step 74 in which the project count is set to i=0 and project 0 is selected. As noted above, if the project array 31 length determined in step 70 is greater than 1, then the project array window 32 is created in step 71. The project array window 32 is then displayed in step 72 and in step 73 a project is selected based on manual user input. Once the project is selected by step 73 or step 74, step 75 initializes, or executes, the selected project.

As a general procedure, steps 70-74 perform a process that checks to see if there is more than one project configured on the system. If only one project is configured, the project array window 32 is not displayed and the single configured project is initialized. If more than one project is configured in the system, then a project array window 32 is constructed and shown to the user giving the user the ability to select which project to initialize.

Figure 7C:
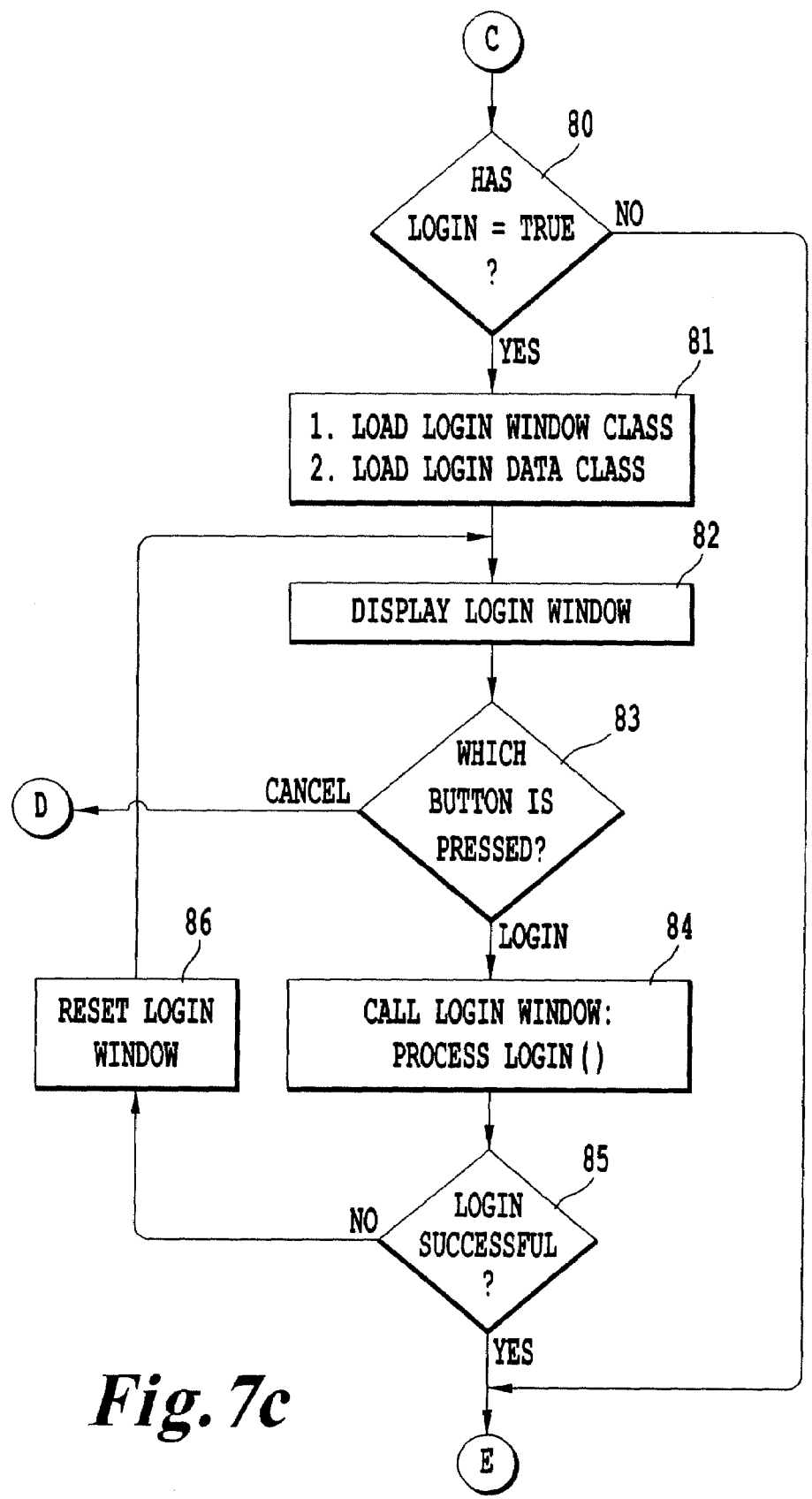

Turning now to FIG. 7C, from C in FIG. 7B step 80 determines if the initialized project includes a login window plug-in 37. If no login window plug-in 37 is installed, flow proceeds to process E of FIG. 7D. If the project includes a login window plug-in 37, then both the login window class and the login data class are loaded in step 81.

Once the class files have been loaded, the login window is displayed in step 82. The login window includes both a login button and a cancel button. Depending on which button is pressed in step 83 the flow proceeds differently. When the login button is pressed the flow proceeds to step 84 in which the process login function of the login window plug-in 37 is called. However, if the cancel button is pressed in step 83, the flow proceeds to process D in FIG. 7B. Process D returns the flow to step 70 to once again display the project array window 32 if the project array 31 is greater than 1.

If the login button is pressed in step 83 the login function of the login window plug-in 37 is called in step 84. Step 85 checks to see if the login was successful. If the login was not successful, the flow proceeds to step 86 to reset the login window and then returns to step 82. If the login was successful, then the flow proceeds to process E in FIG. 7D.

Thus FIG. 7C includes the general procedure of completing authentication if the login window plug-in 37 is installed in the selected project 33a . . . n. If no login window plug-in 37 is installed, then the entire login process is skipped.

Figure 7D:
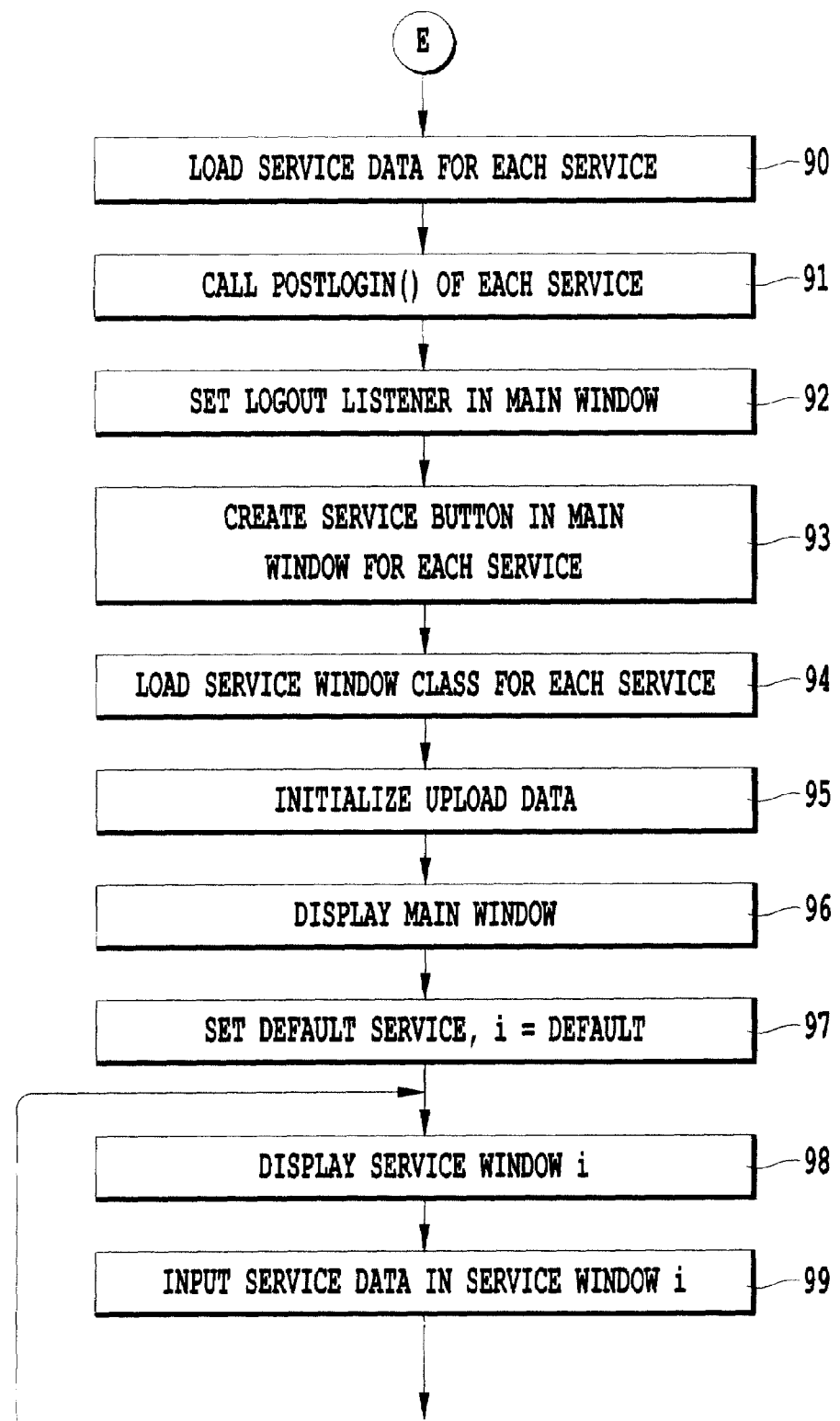

Turning now to FIG. 7D, in step 90, service data for each service is loaded. Once the service data is loaded, the flow proceeds to step 91 where the post-login function of each service is called. In step 92, the logout listener is set in the main window 35. Additionally, in step 93 a service button for each service 38a ... n is created in the main window 35. The service window class for each service is then loaded in step 94 and the upload data 50 is initialized or created in step 95.

Once the upload data 50 is initialized in step 95, the main window 35 is displayed to the user in step 96. The default service is then selected in step 97 and the service window corresponding to the selected service is displayed in step 98. In step 99 service data is input in the service window displayed in step 98. The flow then proceeds to step 100 which checks if the auto-logout time has expired. The auto-logout feature forces the flow to proceed to the logout step 101 if no user activity is detected for a predetermined period of time. If the auto-logout time is determined not to have expired in step 100 the flow proceeds to step 101 which determines if a button was pressed. If a button was pressed the flow proceeds to step 102, if not the flow returns to step 100. Step 102 determined which button was pressed. If one of the service buttons was pressed then the selected service is set in step 103 and the flow returns to step 98 where the newly selected service window is displayed. If in step 102 the logout button is pressed the flow proceeds to step 101 where each service is reset, the main window 35 is reset and the upload data is reset.

If the MFP "start button" is pressed by user in step 102 the flow proceeds to step 105. In step 105 the scan is completed. The flow then proceeds to step 106 where the upload data 50 is copied and added to the job queue 53.

Figure 8:
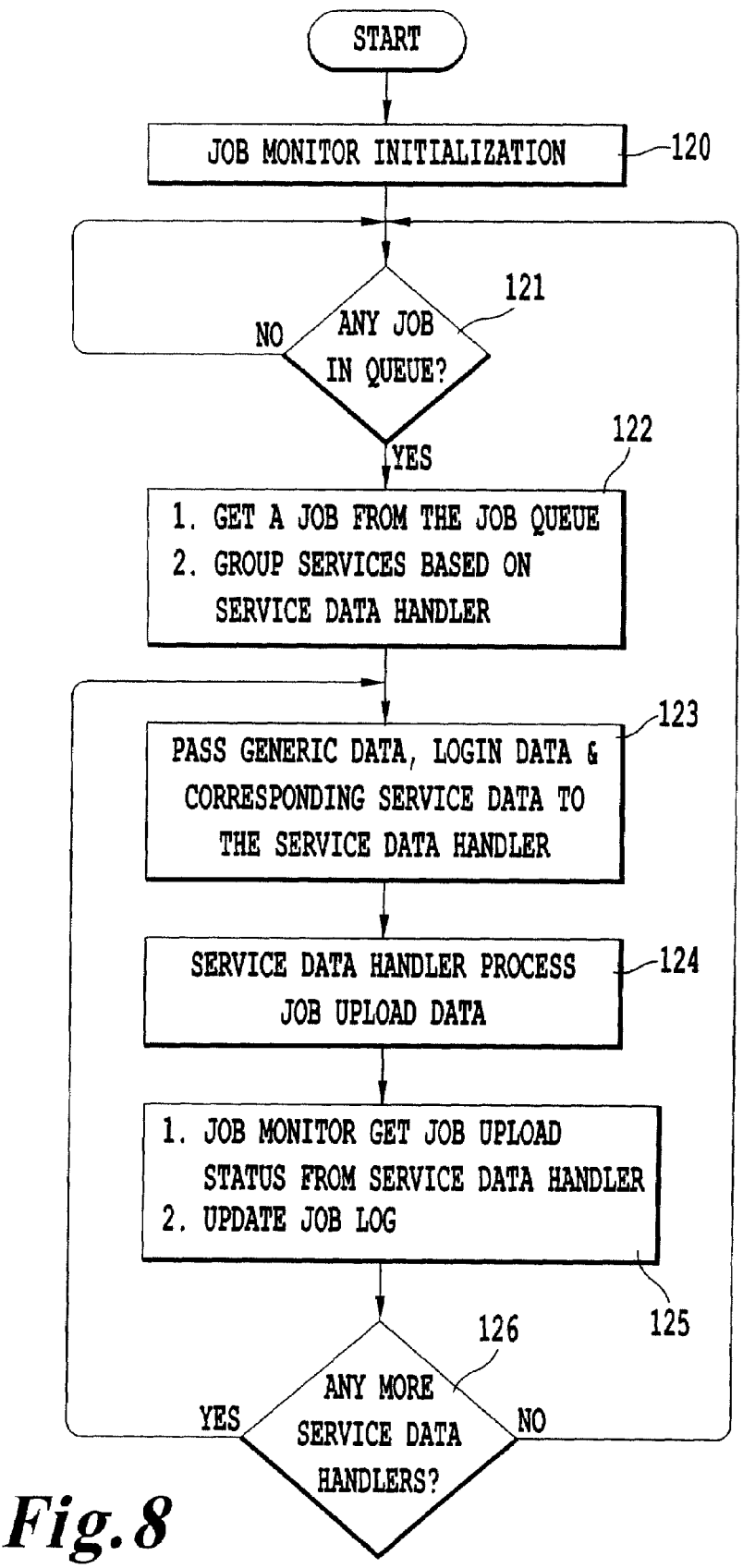
FIG. 8 is a flowchart of the Unified Client Upload thread.

Turning now to FIG. 8, FIG. 8 shows a flowchart of the unified client upload thread 51. After starting, a job monitor initialization is performed in step 120. The system then checks if any jobs are in the job queue 53 in step 121. If no jobs are determined to exist in the job queue 53, flow proceeds back to the beginning of step 121. The system continues in this for a loop until a job is observed in the job queue 53.

When a job is determined to exist in the job queue 53 in step 121, flow proceeds to step 122 and gets the job from the job queue 53 and groups services included in the job based on the corresponding service data handler 54a ... n. Next, generic login data and corresponding service data is passed to the service data handler 54a ... n in step 124. The service data handler 54a ... n then processes the job upload data 50 in step 124.

Once the service data handler 54a ... n has processed the job upload data 50, the job monitor 51 gets the job upload status from the service data handler 54a ... n and updates the job log in step 125. Flow proceeds to step 126 which checks to see if there are any more service data handlers 54a ... n. If no service data handlers 54a ... n remain for the job, then flow moves back to step 121 to check for new jobs in the queue. If more service data handlers 54a ... n are included in 126, flow proceeds back to step 123 and processes steps 123-125 again. This loop continues until no service data handlers 54a ... n remain for a job.

Thus the unified client upload thread includes two loops, the first checks for new jobs in the queue. The second loop occurs once a job is determined to exist, in the second loop, the system loops through checks to make sure all of the service data handlers 54a ... n in a job have been processed.

Figure 9:
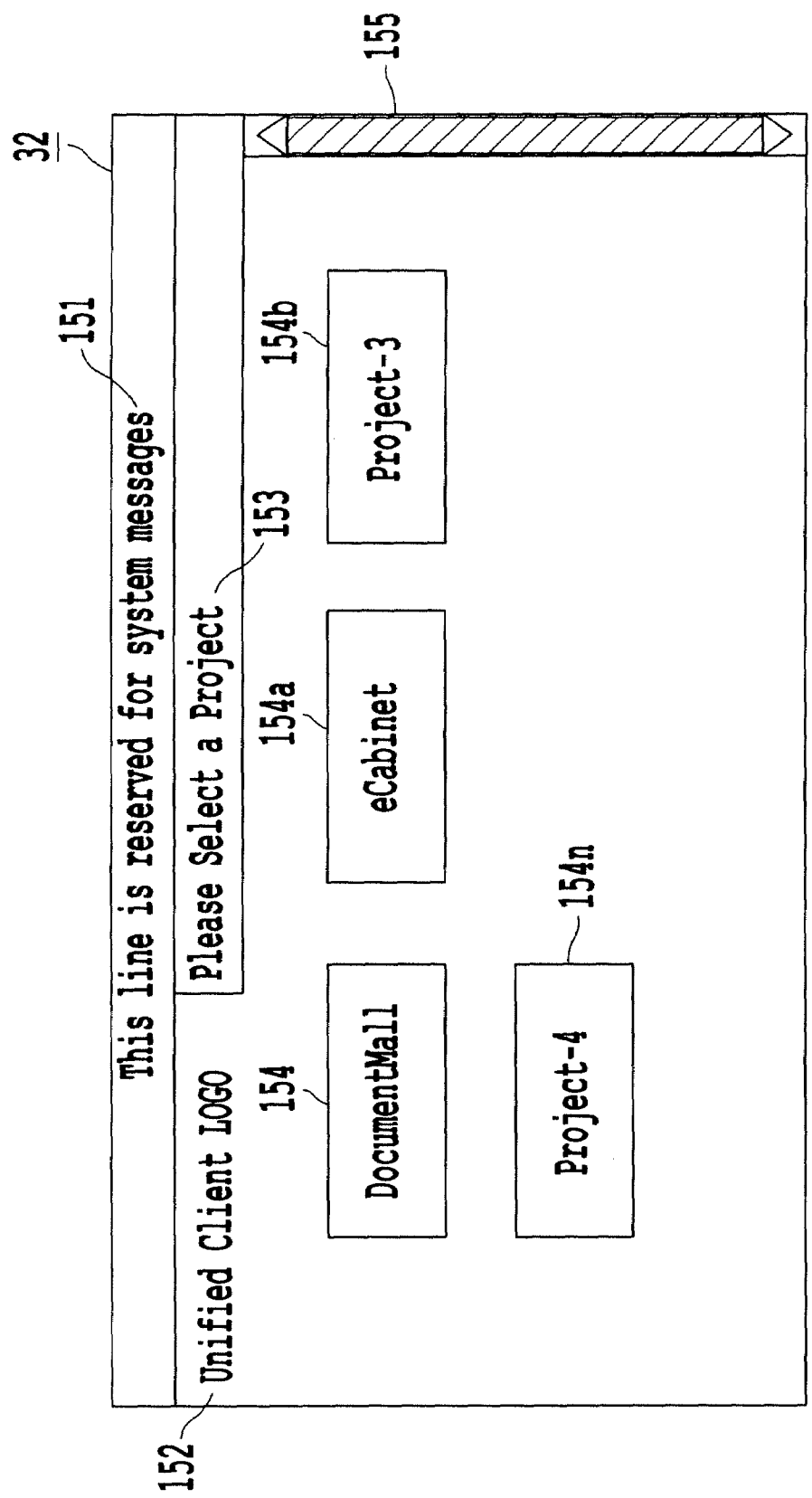
FIG. 9 shows an exemplary project array window which allows the user to select a project.

Moving now to FIG. 9, there is shown an example of a project array window 32. The project array window 32 includes a line reserved for system messages 151. Also included is a unified client logo 152 and instructions to the user on how to use the project array window 153. The project array window 153 also includes several project buttons that are selectable by the user 154 and link the user to the main window 35 and default service window of the selected project 33a ... n. Examples of such buttons are the Document Mall(™) button 154, the eCabinet(™) button 154a or other similar type projects buttons 154b, 154n. The scroll bar 155 allows a number of project buttons to be installed in the project array window 32. Thus the function of the project array window 35 is to allow a user to select which project 33a ... n the user may like to use on the MFP.

Figure 10:
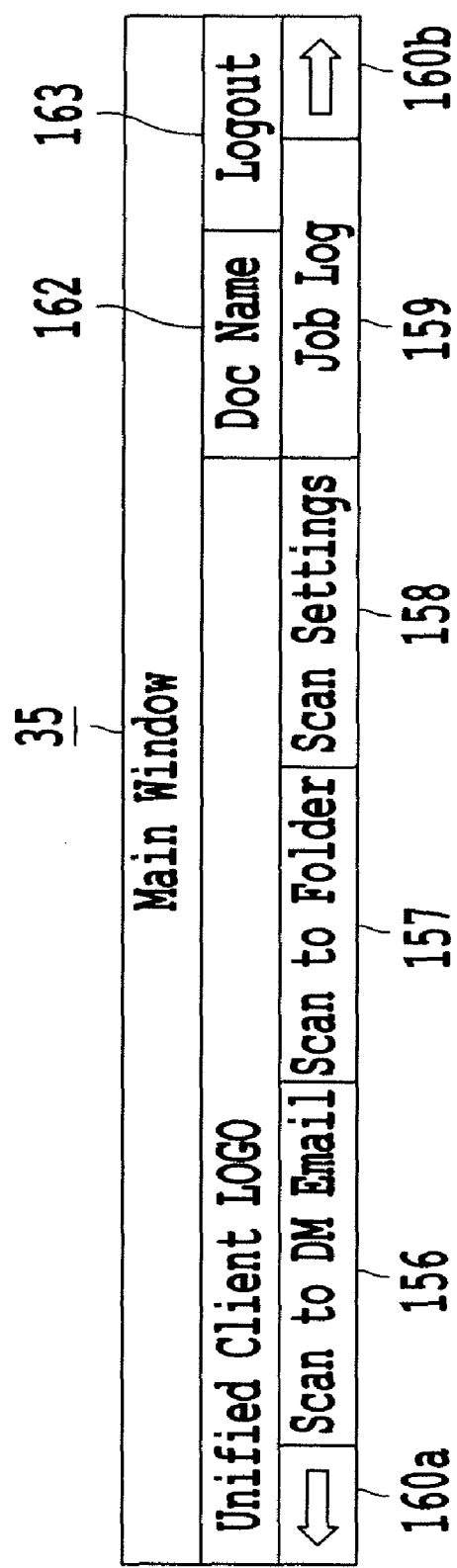
FIG. 10 shows a main window which allows the user to select different services of the selected project.

FIG. 10 shows an example of a main window 35. The main window 35 includes the unified client logo 161 as well as the document name 162 and a logout button 163. As discussed earlier with respect to FIG. 7d, the logout button 163 allows the user to log out of the selected project and return to the project array window 32 described in FIG. 9. The main window 35 also includes a number of buttons 156 through 159 which correspond to a number of services. The buttons displayed in the main window 35 correspond to the project 33a ... n which was selected in the project array window 32. For example, when the Document Mall(™) project is selected 154 in the project array window 35, several Document Mall (™) related buttons are available. For example, the button 156 allows the user to open a scan to a Document Mall(™) e-mail service window. Item 157 allows the user to open a scan to a folder service window. Item 158 is a button that open up the scan settings service window. While item 159 allows the user to open up the job log service window. The invention is not limited to the number of buttons included in FIG. 10 or the services shown in FIG. 10. Additionally arrow buttons 160a and 160b allow the user scroll through a number of service buttons. Thus, any type of service button can be installed on the main window 35.

FIGS. 11A-11C show an example of a config.xml file 7. It should be noted that FIGS. 11A-11C are not intended to be a comprehensive example of how a config.xml file 7 may be designed. Instead FIGS. 11A-11C include one way that a config.xml file 7 might be written for a unified client application 5.

FOG. 11a begins the example of the config.xml file 7. In line 1 of FIG. 11A, the config.xml file 7 begins with the root tag. Under the root tag are the jar file list tags which include different jar files that are installed on the system. A jar file is a single file that includes several class files. The class files each include portions of code that, in the present example, correspond to different services 38a ... n. In the present embodiment, the jar files listed in the config.xml file 7 correspond to plug-ins 8 that are installed in the unified client application 5. In this example, the eCabinet(™) jar file and the Document Mall(™) jar file are installed. The eCabinet (™) jar file corresponds to the eCabinet(™) plug-in 8b and a Document Mall(™) jar file corresponds to Document Mall (™) plug-in 8a. Each plug-in also corresponds to a project 33a ... n as shown in line 6.

In line 6, the project tag begins the project 33a ... n and in line 7 the project name is designated, in this example the project name is described as eCabinet(™). The default scan setting, included in line 9, is empty in this example but could include a number of different settings. In line 11 the default resolution setting tag is included, in this example, the default resolution is set to 200, which corresponds to 200 dpi. In line 13 the default double side scan setting is included. In this example the default double side scan setting is set to false. This setting allows the user to set if the multi-function printer will scan both sides of the paper instead of just a single side. In line 15 the login setting for the project is included. In this example, the eCabinet(™) project does not have a login. However, this setting could also be set to true. In one embodiment of the config.xml file 7, if in line 15 the login setting is set to true, in line 16, a login class should be included. Other embodiments may not include the class file in this manner. In this example, no login class is included because the login setting in line 15 is set to false.

As discussed earlier, each project 33*a* . . . *n* includes a number of services 38*a* . . . *n*. In line 17, the service tag begins the section describing a service 38*a* . . . *n*. In line 19, the service's name is included and in line 20 the display name is also included. In this example, the service name is set to eCabinet(™) and the display name is set to eCabinet(™) owner. The display name setting shows how the service is displayed in the service buttons in the main window 35. For each project a data handler is included and for each service a service window is included. In this example, in lines 22 and 23 the service window class file is listed. The service window class file includes all the code necessary to display the service window. In lines 25 and 26 the data handler class file is listed. This includes all the code necessary for the data handler in this project. Beginning on line 27, configuration data for this service is included. In this example, on line 29 the eCabinet (™) server address is listed as 11.11.11.111. The address 11.11.11.111 is an example of an address that may be used other addresses including IPv6 addresses or named addresses, such as domain names, can also be used. Further, the eCabinet(™) server port is listed as port 81. Other port numbers could also be used in this example. Beginning on line 33, the data handler configuration data is included. In this example, the data handler configuration data includes the eCabinet(™) server address on line 33*a* . . . *n* and the FTP port on line 32*a* . . . *n*. If no FTP port is included in line 32*a* . . . *n* a default ftp port is used, such as 21. On line 37, the data handler configuration data tag is closed and on line 38 the service is closed. Thus the eCabinet(™) service configuration in this example is described between lines 17 and 39.

Turning now to FIG. 11B, in FIG. 11B a second service included underneath the eCabinet(™) project is described. Beginning on line 1, the service tag opens the service. The service name in this example is included on line 2 and is listed as eCabinet(™)Folder. The display name included on line 3 is listed as eCabinet(™) Folder. As was the case in the eCabinet (™) service described above, the eCabinet(™) Folder service also includes a service window class shown on lines 5-7 and a data handler class included in lines 9-11. Also included in the eCabinet(™) folder service are the eCabinet(™) server address, on line 14, and the eCabinet(™) server port included on line 16. Also in this example, the data handler configuration data is included on line 19 and includes an eCabinet(™) server address, on line 21, and a FTP port setting on line 22. The service is then closed on line 24 and the project is closed on line 25. Thus in this example the eCabinet(™) project includes two services, the eCabinet(™) service and the eCabinet(™) Folder service.

Line 27 continues the example of the config.xml file 7. On line 27 of FIG. 11*b* a new project is opened with a project tag. This project name is described on line 29 as Document Mall (™). In this example, in line 31, the default scan setting tag is opened and closed denoting the default setting and, in line 32, the default resolution is set to 200. In line 33, the default double siding scan is set to true and in line 35 the login setting is set to true. As was noted in the discussion regarding eCabinet(™) project above, as the login setting is set to true in this example in line 35, in lines 37 and 38 the login class file is described. In contrast to line 16 of FIG. 11A, in the Document Mall(™) project example the login class is included.

Turning now to FIG. 11C, in FIG. 11C the service tags included under the Document Mall(™) project are described. The first service begins with a service tag, included on line 1. In line 2, the service name DMEmail is included and on line 3 the display name DM Email is also included. This service window class is described at lines 5-7 and the data handler class is described in lines 8-10.

Beginning on line 11, the configuration data for the Document Mall(™) email service is included. In this example, in line 12, the Document Mall(™) server address is included as documentmall.com and in line 13 the configuration data tag is closed. In line 15 the data handler configuration data tag is opened. Within this tag, in line 16, the Document Mall(™) server address is included and on line 17 the data handler configuration data tag is closed. In line 18 the Document Mall(™) Email service is closed.

Line 20 begins a second service under the Document Mall (™) project with the service tag. On line 21 the service name of DMFolder is included and in line 22 the display name DM folder is also included. In lines 24-26 the service window class is described and in lines 27-29 the data handler class is described. In line 30, the configuration data begins with the configuration data tag. In line 31, the Document Mall(™) server address is included. In line 32 the configuration data is closed. Lines 33-35 show the data handler configuration data, with line 34 showing the Document Mall(™) server address. In line 36, the close service tag closes the service. In line 37, the close project tag closes the Document Mall(™) project. In line 38, the close root tag closes the config.xml file 7.

A functional example of the unified client application 5 installed on a multi-function printer will now be described in FIGS. 12-16. In this example, the unified client application 5 is installed with the eCabinet(™) plug-in 8*b*. The unified client application 5 with an eCabinet(™) plug-in 8*b* is developed using SDK/J and uses the CVM option on each MFP in which the unified client application 5 is installed. SDK/J is an embedded software architecture software development kit ("SDK") which allows in house developers, independent software vendors and system integrators to deliver customized JAVA based solutions on MFPs. The CVM option is the Java virtual machine that is able to be installed on the MFP. Other types of virtual machines and/or programming languages can be used to create plug-ins associated with the unified client application.

The example of the unified client application 5 with the eCabinet(™) plug-in 8*b* uses 2 SDK/J type applications, the 2 SDK/J applications are, for example, one Java xlet application which implements major unified client functionalities and one servlet application which allows user to update the config.xml file 7 remotely via a web browser. Some of the services that are supported by the unified client application 5 with the eCabinet(™) plug-in 8*b* are: scan to eCabinet(™) server, scan to eCabinet(™) folder, scan settings and job log viewing. These services are represented as service buttons in the eCabinet(™) project main window 35. In the case that the unified client application 5 only includes one project 33*a* . . . *n* installed, such as in the present example, a default service window is the first window displayed along with the main window 35.

Figure 12:
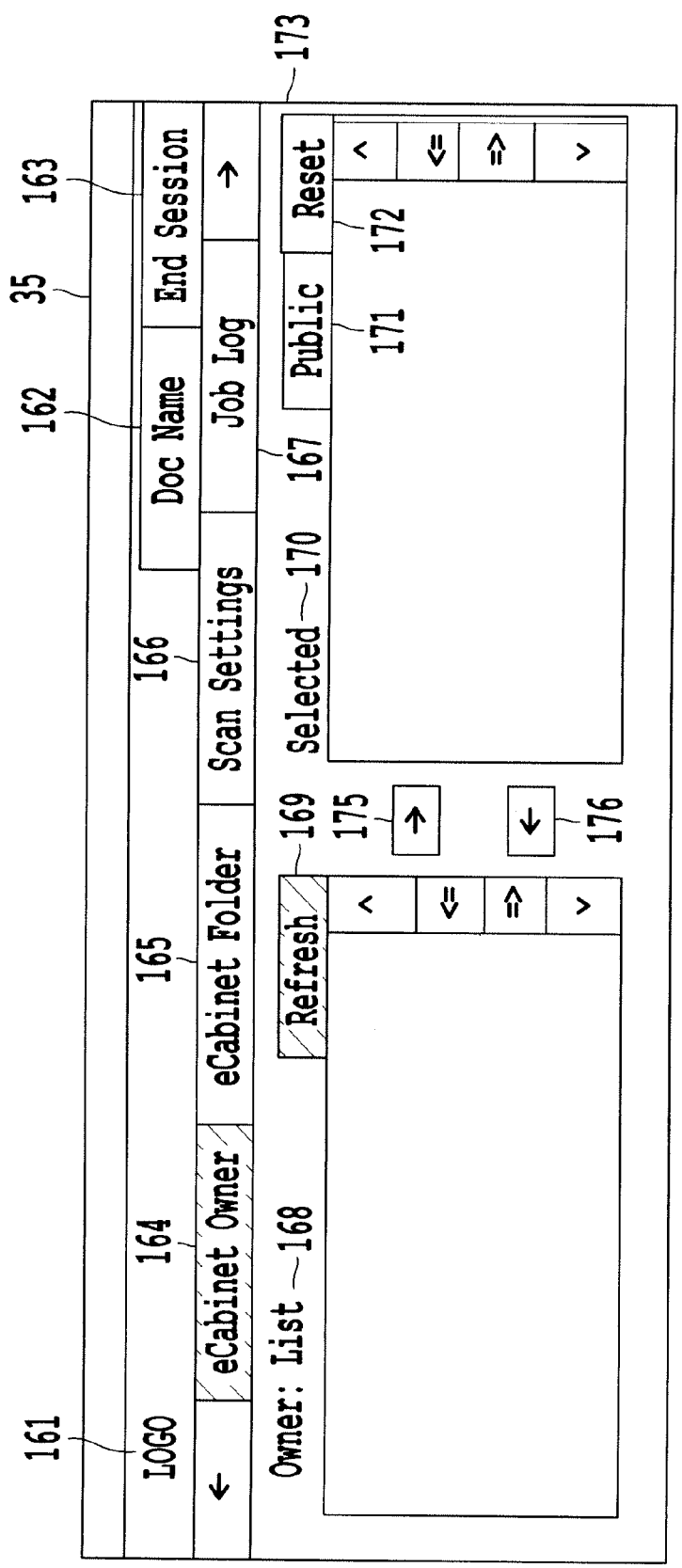
FIG. 12 is exemplary user interface of an eCabinet(™) plug-in in which the eCabinet(™) project main window and the eCabinet(™) Owner service window are displayed.

In FIG. 12, an example of a main window 35 and service window 173 is shown. The main window 35 and the eCabinet (™) owner service window 173 are displayed. The main window 35 includes a logo 161 as well as the document name 162 and an end session or logout button 163. Further, several service buttons 164-167 are also included in the main window 35. In the eCabinet(™) example, the first service button is the eCabinet(™) owner button 164. In FIG. 12, this button is selected and as a result the corresponding eCabinet(™) owner service window 173 is displayed. The left side of the eCabinet (™) owner service window includes an order list window 168 and a refresh button 169. Further, on the left side of the eCabinet(™) owner service window 173 there is a selected owner's window 170. Also included are a public 171 and reset button 172. The eCabinet(™) owner button offers users the scan to eCabinet(™) owner service. The owner list is downloaded from the eCabinet(™) server automatically and is displayed in the owner list window 168. Multiple owners can be selected if no eCabinet(™) folder is selected in the eCabinet(™) folder window 193. When an eCabinet(™) folder is selected in eCabinet(™) folder window 193, only a single owner selection is allowed. The owner list window 168 shows a list of the owners. The selected window 170 shows the destination owners. To add a destination owner, the user can highlight desired owners in the owner list window 168 and press the right arrow button 175. To delete a destination owner, the user can highlight the owner in the selected window 170 and press the left arrow 176. The refresh button 169, allows the user to download the owner list from the server again. The public button 171 allows the user to set the attribute of the scan document to public or private. The reset button 172 allows the user to remove all of the contents of the selected window.

Figure 13:
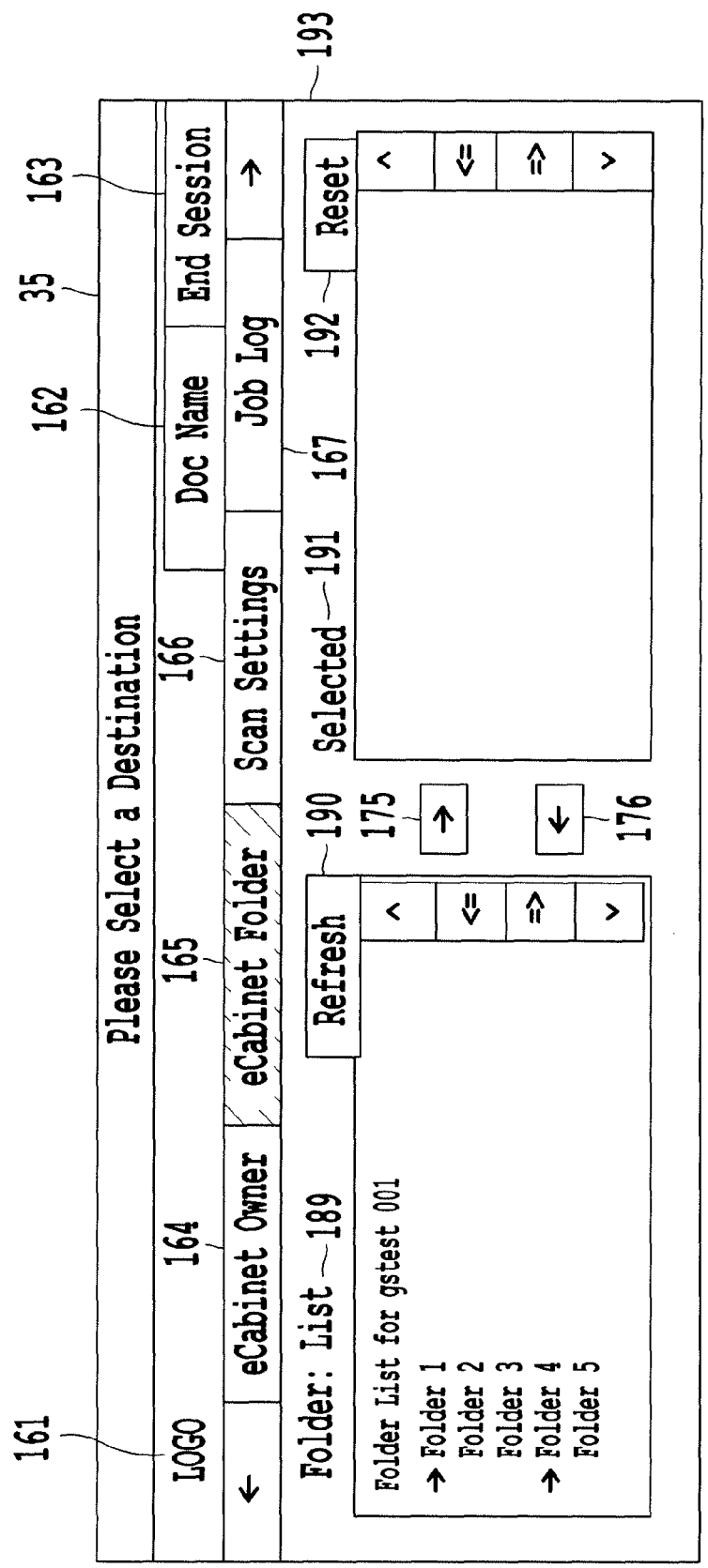
FIG. 13 is an exemplary user interface of an eCabinet(™) plug-in in which the eCabinet(™) project main window and eCabinet(™) Folder service window are displayed.

FIG. 13 shows an example of the main window 35 with the eCabinet(™) folder service button 165 selected and the eCabinet(™) folder service window 193 displayed. In this example the eCabinet(™) folder button 165 has been selected and as a result the eCabinet(™) folder service window 193 is displayed. The eCabinet(™) folder service window 193 includes a folder list window 189, a refresh button 190, a selected window 191, and a reset button 192. The eCabinet (™) folder service offers users the ability to scan to the eCabinet(™) folder service. The eCabinet(™) folder list is downloaded from the eCabinet(™) server automatically using the configuration settings included in the config.xml file 7. When users select the eCabinet(™) folder button 165 the unified client application 5 prompts user with a software keyboard to enter a user name and a password. The unified client application 5 then downloads the user's folder tree and displays the tree in the folder list window. Note that using the eCabinet(™) folder service requires single owner selection. If multiple owners have been selected in eCabinet(™) owner service window 173 and the user presses eCabinet(™) folder button 165 an error message will pop up stating eCabinet(™) folder service requires single owner selection. The folder list window 189 shows a user's eCabinet(™) folder tree. The user can browse the folder tree in the folder list window 189. To add a destination folder, the user can highlight the desired folder in the folder list window 189 and press the right arrow button 175. To delete a destination folder in the selected window 191, the user can highlight the desired folder in the selected window 191 and press the left arrow button 176. It should also be noted that multiple folders can be selected. The refresh button 190 allows the user to download the eCabinet (™) folder list again from the eCabinet(™) server. If the refresh button 190 is pressed, the user will be prompted for the user name and password entry again. The reset button 192 allows all the contents placed in the selected window 191 to be removed. It should also be noted that the eCabinet(™) folder list included in the folder list window 189 is dependent upon the owner selected in the eCabinet(™) owner service window 173 included in FIG. 12. The user that is selected and included in the selected window 170 is the user who corresponds to the folder list included in the folder list window 189.

Figure 14:
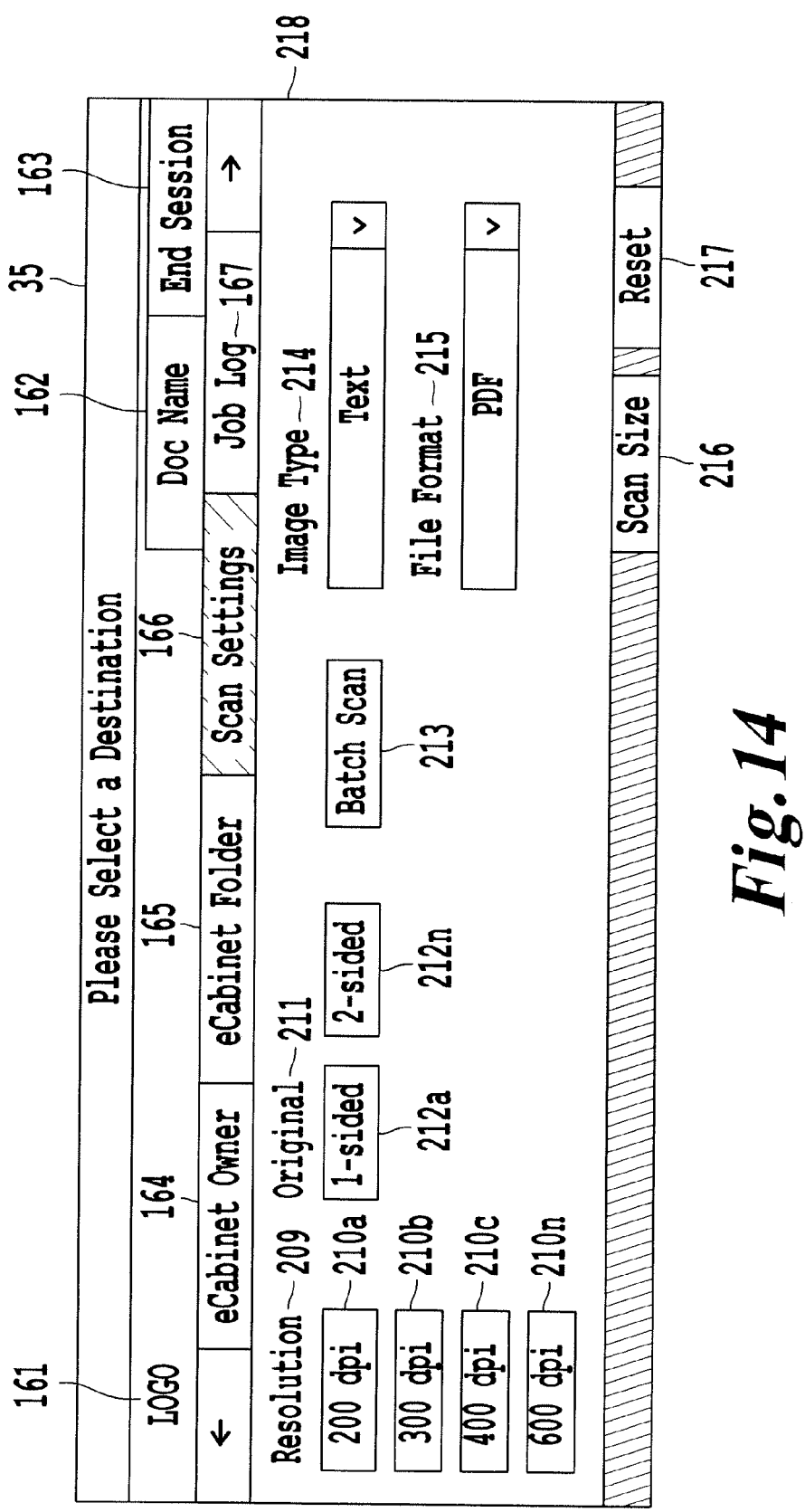
FIG. 14 is an exemplary user interface of an eCabinet(™) plug-in in which the eCabinet(™) project main window and the scan settings service window are displayed.

FIG. 14 shows the user interface for an example of when the scan settings button 166 is selected. When the scan settings 166 button is selected, the scan settings service window is displayed 218. The scan setting service window includes several options including resolution 209, original 211, image type 214 and file format 215. Under the resolution option 209, several different buttons relating to scanner resolution are used. In this example, DPI 200, 210a, 300 DPI, 210b, 400 DPI, 210c, or 600 DPI, 210n, are available to be selected. Other similar types of DPI options resolution options could also be used. The original option 211, includes two buttons. The first button 212a allows the one sided option to be selected. The second button 212n allows the two sided option to be selected. Further, a batch scan button is displayed 213. The image type option 214 also includes a drop-down menu listing a number of image types. In the current example, the text option is displayed. It should also be noted that in the image type drop-down box text, photo, gray scale or photo options are available. Similarly, under the file format option 215, a second drop-down box is included listing a number of different file formats. In the present example, the PDF option is displayed. However, in the file format drop-down box single page tiff, multi-page tiff, jpeg and PDF options are available. Also included on the scan setting service window 218 is a scan size 216 button and a reset button 217.

Figure 15:
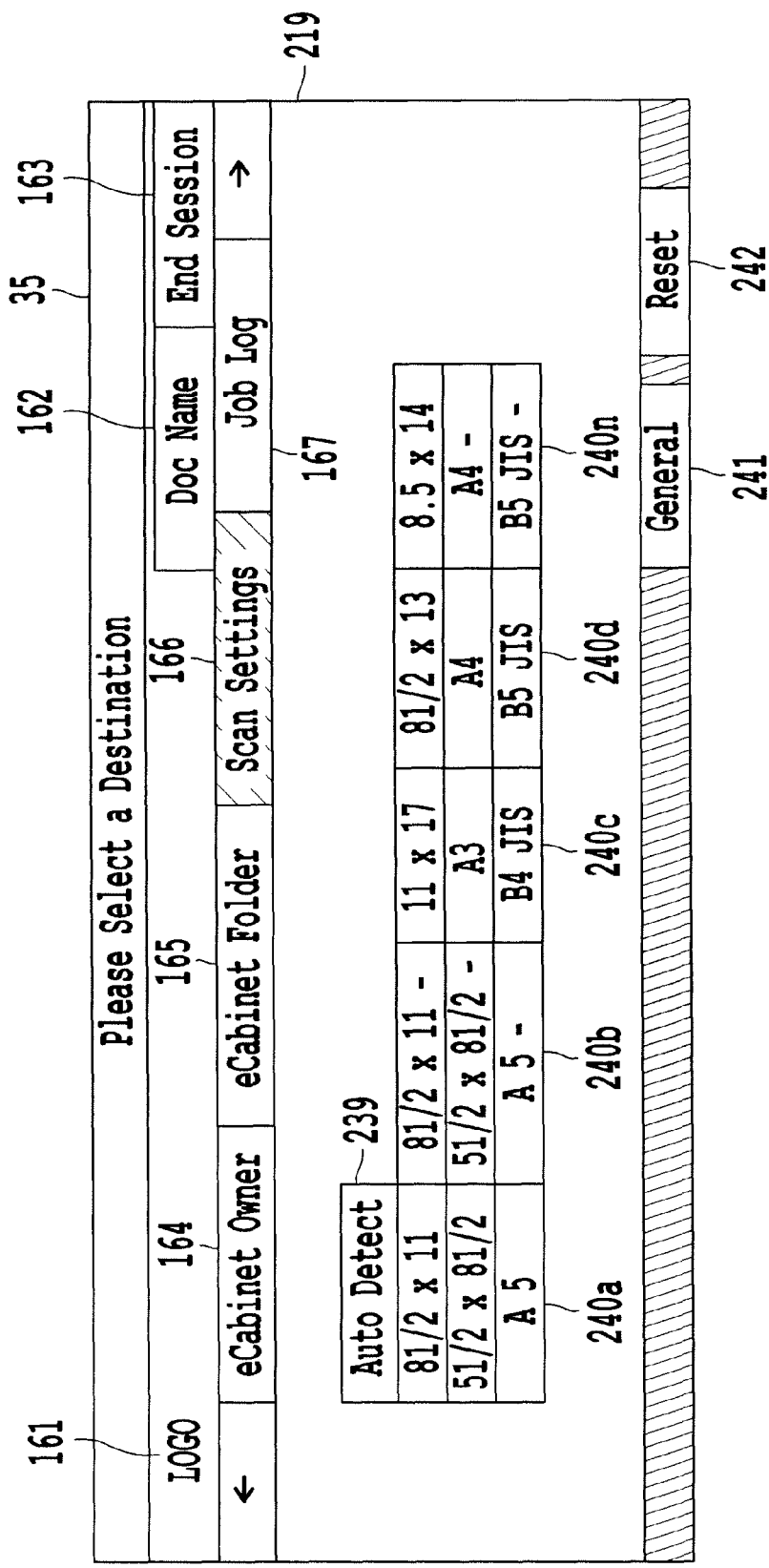
FIG. 15 is an exemplary user interface of an eCabinet(™) plug-in in which the eCabinet(™) project main window and the scan settings service scan size sub-window are displayed.

The scan size button 216 opens a new window which is shown in FIG. 15. The scan size window 219 is still part of the scan sittings service window 218. However, the scan size window 219 is displayed in place of the scan setting service window 218 under the main window 35. In the scan size window 219, several different options are available. For example, auto detect 239, 8×11 5-½8-½ A5, 240a, 8-½×11 5-½×8-½A5 240b, 11×17 a3, B4 JIS 270c, 8-½×13 A4 B5 JIS 240d, and 8-½×14 A4 B5 JIS 240n. Also included are a reset button 242 and a general button 241 which returns the user to the original scan settings service window 218.

FIG. 16 shows the main window 35 and the job log service window 264 displayed when the job log button 167 is selected. In the job log service window 264 date and time 259, document name 260, pages 261 and status 262 titles are displayed. From the job log service window 264 users can check scan job upload status specifically through the date and time, the document name, number of pages and the status of the job. This concludes the MFP display example of the eCabinet(™) plug-in 8b.

Figure 17:
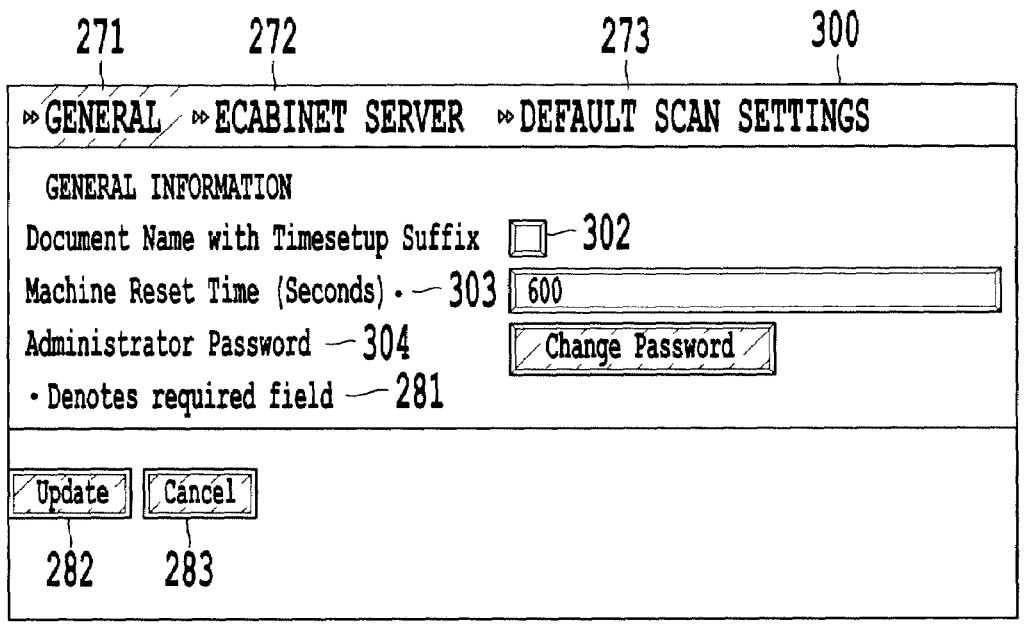
FIG. 17 shows a general configuration screen displayed by the Unified Client remote configuration web page.
Figure 18:
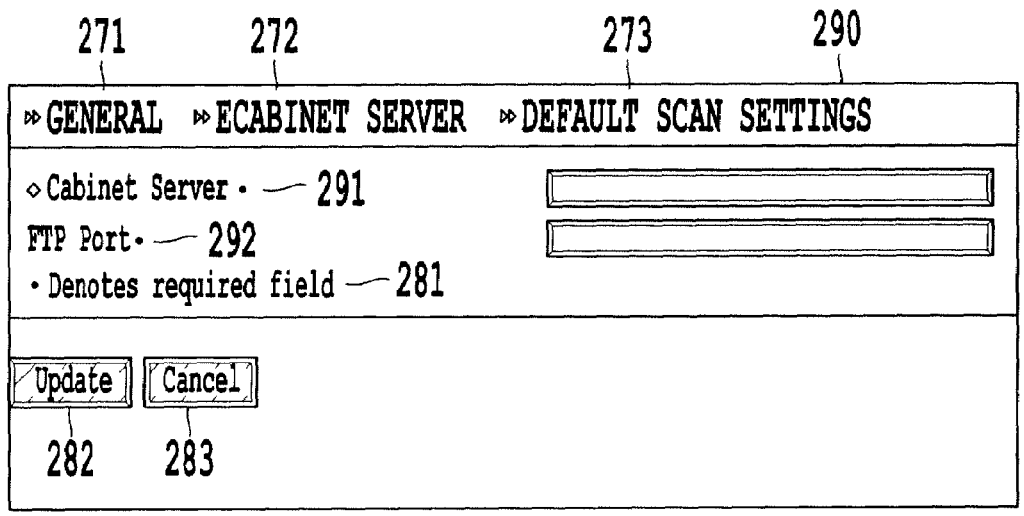
FIG. 18 shows an eCabinet(™) server screen displayed by the Unified Client remote configuration web page.
Figure 19:
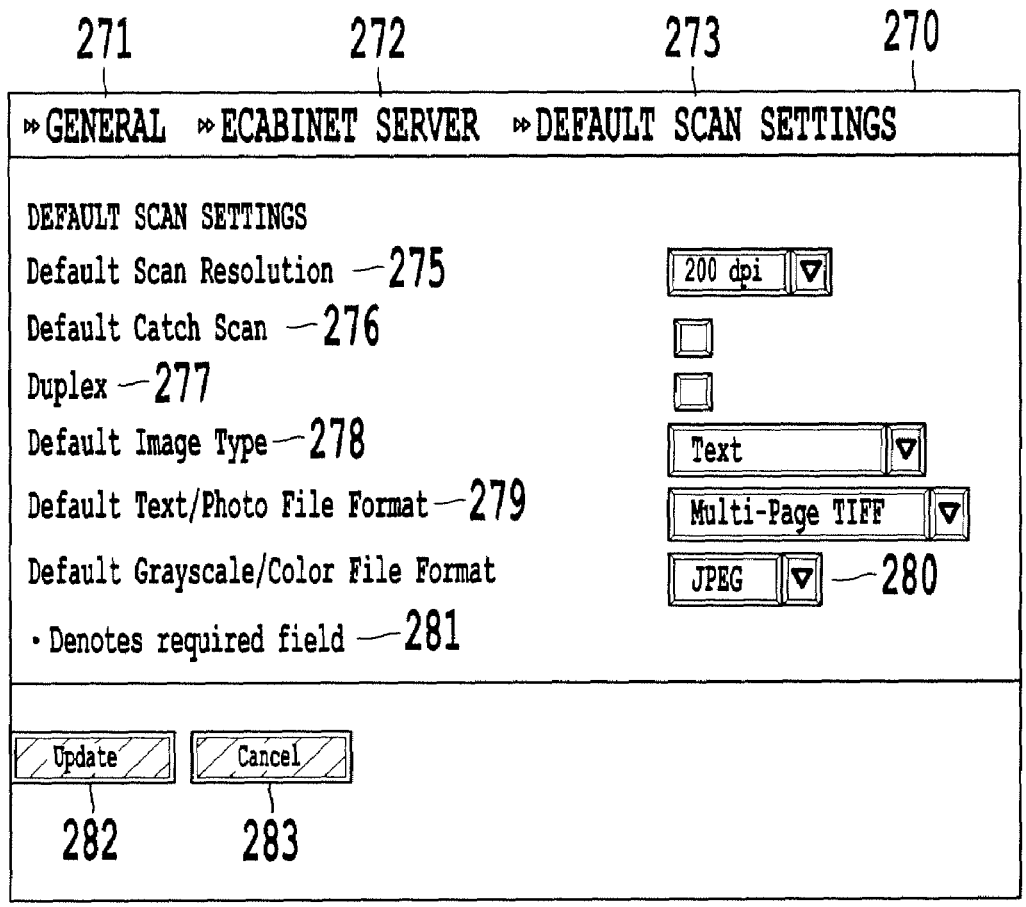
FIG. 19 shows a default scan settings screen displayed by the Unified Client remote configuration web page.

FIGS. 17-19 show an example display for managing the settings of the eCabinet(™) plug-in 8b remotely. The unified client application 5 with the eCabinet(™) plug-in 8b can be configured remotely through web access. For security purposes the website is protected by a password. FIGS. 17-19 show an example of the remote configuration website for eCabinet(™) plug-in 8b.

FIG. 17 shows an example of the general configuration window 300 on the remote configuration website of the unified client application 5 with the eCabinet(™) plug-in 8b installed. When a user accesses the website shown in FIG. 17 three options will be shown. The general window button 271 the eCabinet(™) server button 272 or the default scan settings button 273. These three options correspond to three screens: the general screen 300, the eCabinet(™) server configuration screen 290 and the default setting configuration screen 270. Several settings are configurable through the general configuration screen 300 that is selected by the general button 271 and is the default screen loaded. First the enable/disable document name with time stamp suffix 302 is checkable. The machine reset timer seconds 303 is available to be changed. The machine reset timer seconds 303 setting relates to an auto session logout with refresh timer. In this example, 600 seconds is placed in the auto session refresh timer. The change administrator password option 304 is also available to be selected; this setting allows the user to change the administrative password for using the remote configuration service. It should also be noted that reinstallation can reset the password to the default. Also included are update 282 and cancel 283 buttons which allow the user to update and to apply the changes that the user has made in the general configuration window 300 or cancel the changes.

FIG. 18 shows the result when the eCabinet(™) server button 272 is selected. The eCabinet(™) server button displays the eCabinet(™) server window 290 which allows the following options: eCabinet(™) server address and FTP port. Both of these are required fields as is shown in 281. The eCabinet(™) server address 291 and FTP port 292 can both be entered by the user. The FTP port 292 is automatically filled with the default ftp port. As with FIG. 17, update 282 and cancel 283 buttons are available.

FIG. 19 illustrates the example of when the default scan settings button 273 is selected. When the default scanning settings button is selected the default scan settings window 270 is displayed. In the default scan settings window 270 a number of options are displayed. First the default scan resolution 275 is available to be changed. In this example, 200 dpi is selected. In the unified client application 5 with eCabinet (™) plug-in 8b installed the default scan resolutions of 200 dpi, 300 dpi, 400 dpi and 600 dpi are available and are displayed in the drop-down box in item 275. The default batch scan option is also selectable 276 along with the duplex 277 option. A default image type 278 is also available to be selected in the eCabinet(™) plug-in 8b example. The default image types available in the drop-down box of item 278 are text, print, text photo, photo or grayscale. These image types correspond to different qualities of the scanned image. The next option available is the default text photo file format 279. In this example, the multi-page tiff option is selected. In the unified client application 5 with the eCabinet(™) plug-in 8b installed the options available for the drop-down box of 279 are single page tiff, multi-page tiff or pdf. Single page tiff is a tiff image file that only includes a single image per file. The multi-page tiff is an image file that includes several images. PDF is a proprietary format to Adobe Systems which includes multiple page fixed-layout documents. The final option is default grayscale/color file format 280. In this example, jpg is selected as the default grayscale/color file format but the pdf option is also available in the unified client application 5 with eCabinet(™) plug-in 8b installed. Item 281 shows required fields that must be selected. As with the FIGS. 23 and 24, update 282 and cancel 283 buttons are available. The update button 282 and the cancel button 283 allow the user to apply the changes with the update button 282 or cancel the changes with the cancel button 283.

Figure 20:
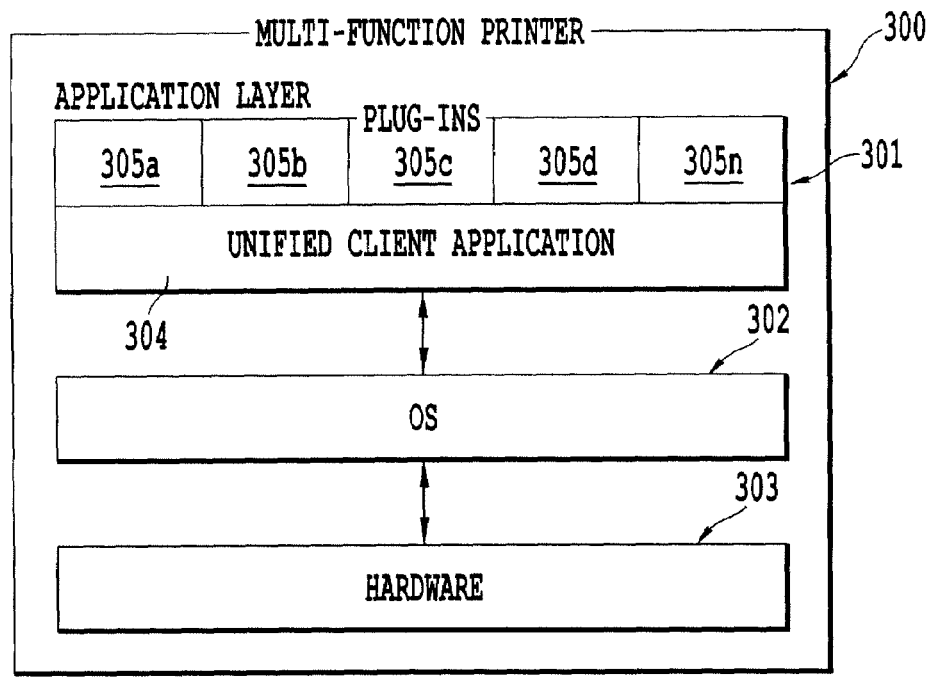
FIG. 20 is a block diagram showing a software configuration of the multi-function printer relative to the hardware and operating system according to an embodiment of the present invention.
Figure 22:
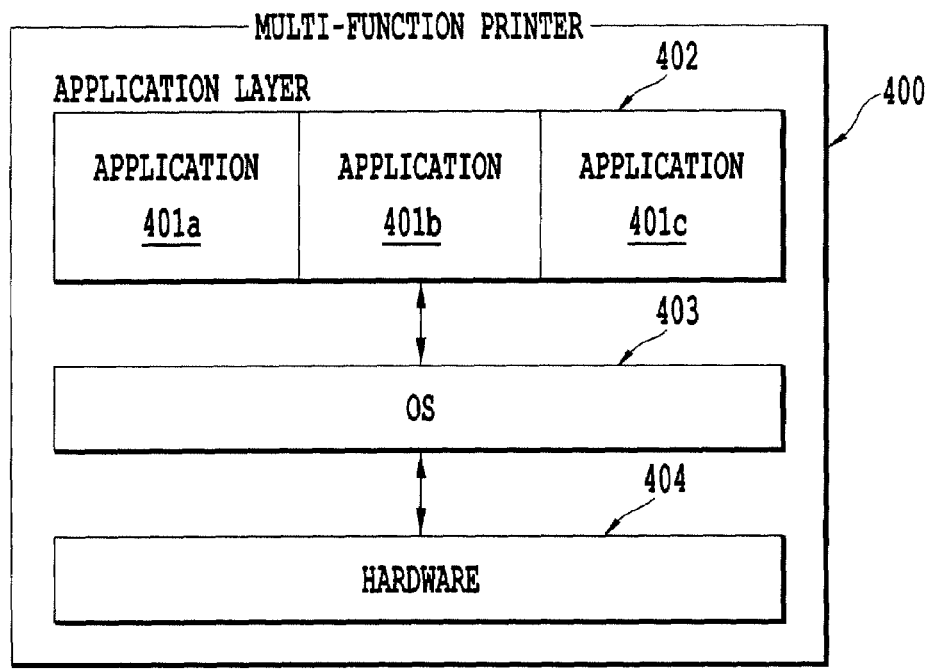
FIG. 22 shows a block diagram showing a typical software configuration for a multi-function printer.

FIG. 20 is a block diagram of an MFP according to an embodiment of the present invention. As shown in FIG. 20, the MFP 300 includes an application layer 301, an OS 302, and hardware resources 303.

The application layer 301 includes the unified client application 304 as well as several plug-ins 305a . . . n which are included in the unified client application 304.

The application layer 301 is a position in a software hierarchy in which applications installed on the application layer 301, such as the unified client application 304, access the hardware 303 through the OS 302. Further the plug-ins 305a . . . n access the OS 302 and the hardware 303 via the unified client application 304 installed on the application layer 301.

It is also important to note that the application layer 301 is independent from the OS 302 and although the application layer 301 accesses the hardware through the OS 302 it is not a part of the OS 302.

The OS 302 is any operating system that accesses the hardware 303. Further, the OS 302 acts as a conduit for allowing applications that are installed on the application layer 301 to access the hardware 303.

The hardware 303 is the physical components of the multi-function printer. For example, hardware 303 can include a scanner, a printer, a fax or any other hardware component.

Figure 21:
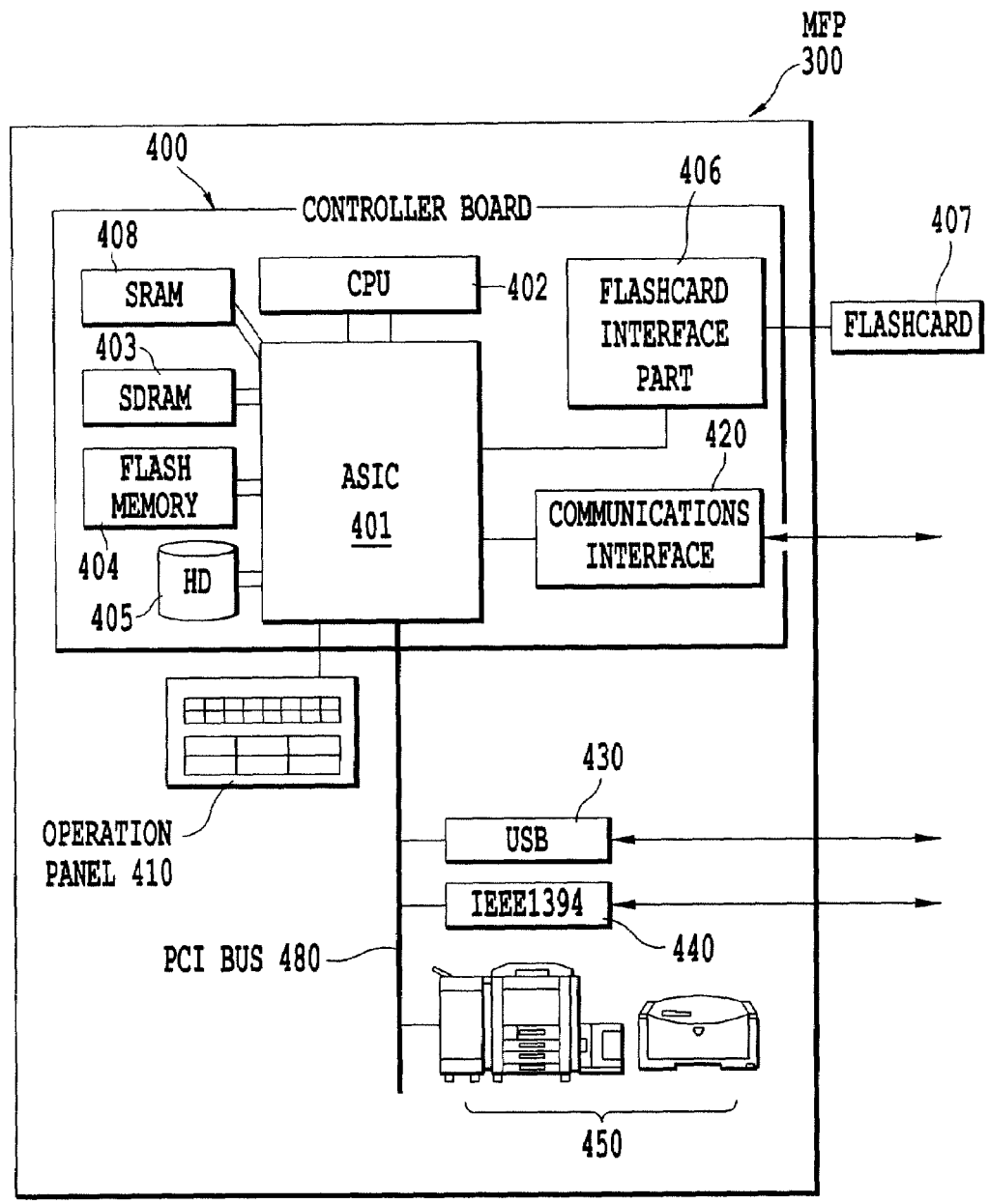
FIG. 21 is a hardware configuration of the image forming apparatus according to an embodiment of the present invention.

FIG. 21 shows an example of a hardware configuration of the MFP 499 according to an embodiment of the present invention. As shown in FIG. 21, the MFP 499 includes a controller board 400, an operation panel 410, a fax control unit (FCU) 420, a USB 430, an IEEE 1394 port 440, and a printer 450. It should be also noted that other types of i/o interfaces could be included including IEEE 1394b, USB 2.0. The controller board 400 includes a CPU 402 for processing and several storage devices such as SDRAM 403, SRAM 408, flash memory (flash ROM) 404, flash card interface part 406 and HD 405 used to store data associated with the MFP 499. Each of these components are connected to the ASIC 401, the ASIC 401 is an application specific integrated circuit that is designed specifically for use in a MFP 499. Other types of storage devices are also possible as well as other types of data processors and integrated circuits. The operation panel 410 is directly connected to the ASIC 401 as is the communications interface 420. The communications interface 420 can also be connected to a network or any other similar type communications medium. The USB 430, the IEEE 1394 440 and the multi-function printer functions 450 such as scanning, printing, and faxing are connected to the ASIC 401 via the PCI bus 480. The SRAM 408 is a nonvolatile RAM, other types of SRAM are also possible. A flashcard 407 can be inserted into a flash card interface part 406, so that data is sent/received between the ASIC 401 and the flashcard 407 via the flash card interface part 406. The operation panel 410 includes an operation part used for key operation such as key input and button pushing and the like by the user, and a display part for displaying drawing data such as various screens. It should be appreciated that other types of hardware components can be used in the present invention.

Further with respect to a computer readable medium such as a floppy disk, magnetic tape, CD-ROM and the like, by installing the program stored in the computer readable medium into an MFP, the MFP can perform the functions of the present invention.

This invention has been described with respect to a multi-function printer, but is applicable to any image handling device such as a copier, digital copier, printer, scanner, digital camera, fax machine, or multi-function printer or any combination thereof. A general purpose computer is not considered an image handling device. Moreover, the invention is applicable to other special purpose devices such as navigation systems, global positioning systems, vending machines, metering systems, machine tools and other tools which operate using programming or a programmed processor, automobiles, other transportation devices such as trains, motorcycles, planes, or boats, radar systems, radios, MP3 players, digital music players, and other audio systems, mobile phones, other communication devices and systems, and any other special purpose device which operates using a plug-in.

The present invention is not limited to the specifically disclosed embodiments, and variations and modifications may be made without departing from the scope of the present invention.

What is claimed is:

1. A method of invoking a set of services corresponding to plug-ins currently installed for an image handling device, comprising:

launching a host application of the image handling device, the host application including host application services;

accessing a configuration file of the image handling device to determine which plug-ins are currently installed for the image handling device, the configuration file including an identification of each currently installed plug-in and an identification of a corresponding set of services provided by each plug-in;

launching each plug-in determined to be currently installed for the image handling device, each plug-in providing the corresponding set of services in an integral fashion to the host application; and presenting a unified graphical interface displaying the host application services and the corresponding set of services of each installed plug-in.

2. The method according to claim 1, wherein the plug-ins are installed for the image handling device remotely via a web-server.

3. The method according to claim 1, wherein the at least one plug-in is designated by a project tag of the configuration file.

4. The method according to claim 1, wherein the configuration file is an XML file.

5. The method according to claim 4, wherein each plug-in corresponds to a jar file.

6. The method according to claim 4, wherein each service spawns a service window and a data handler process.

7. The method according to claim 6, wherein each service includes a service window class file and a data handler class file.

8. A method of implementing a unified client application on an image handling device, the image handling device including an application layer, hardware and an operating system, said method comprising:

launching a host application;

reading a configuration file, the configuration file including configuration information utilized by the host application, the configuration information designating a number of currently installed plug-ins and a number of services provided by each plug-in;

determining which plug-ins are installed based on information obtained by the reading the configuration file;

generating a project array based on a result of the determining, the project array corresponding to the installed plug-ins designated by the configuration file;

generating a service array for each project, the service array corresponding to the services included in each corresponding plug-in, the project array being associated with the service arrays via a hierarchical relationship;

displaying a project array window, the project array window graphically displaying each project included in the project array;

displaying a main window and a default service window in response to a project being selected in the project array window, the main window including graphical indicia of a plurality of project services in a service array corresponding to the selected project, and the default service window including options for entry and selection;

displaying options in a corresponding service window for entry and selection in response to one of the graphical indicia of the plurality of project services being selected;

adding upload data produced by the hardware of the image handling device and options entered and selected in the service window to a job queue; and processing upload data in the job queue using a service data handler, the service data handler being a service for sending the upload data from the image handling device to a destination included in a configuration file.

9. A non-transitory computer readable medium storing program code for causing an image handling device to perform a method of invoking a set of services corresponding to a plug-in application installed on an image handling device, comprising:

launching a host application of the image handling device, the host application including host application services;

accessing a configuration file of the image handling device to determine which plug-ins are currently installed for the image handling device, the configuration file including an identification of each currently installed plug-in and an identification of a corresponding set of services provided by each plug-in;

launching each plug-in determined to be currently installed for the image handling device, each plug-in providing the corresponding set of services in an integral fashion to the host application; and presenting a unified graphical interface displaying the host application services and the corresponding set of services of each installed plug-in.

10. An image handling device, comprising:

a host application;

at least one installed plug-in application subservient to the host application;

a display device;

a memory configured to store a configuration file associated with a host application, the configuration file including:

an identification of each plug-in which is currently installed and associated with the host application;

at least one project corresponding to each plug-in;

at least one service corresponding to the at least one project and including data indicating the functions provided by the at least one service, the at least one service being associated with the at least one project via a hierarchical relationship;

a controller configured to interface with the host application and present a unified graphical interface displaying the host application services and the corresponding set of services of each installed plug-in, wherein the controller displays project selection data enabling the user to select a project and displays service selection data, corresponding to the selected project, enabling the user to select a service.

* * * * *